United States Patent [19]

Kissel, Jr.

[11] Patent Number: 5,063,857
[45] Date of Patent: Nov. 12, 1991

[54] COMPREHENSIVE UNIT TRANSPORATION SYSTEM

[76] Inventor: Waldemar F. Kissel, Jr., 4321 NW. 66th Terr., Gainesville, Fla. 32606

[21] Appl. No.: 251,344

[22] Filed: Sep. 29, 1988

Related U.S. Application Data

[63] Continuation-in-part of Ser. No. 82,839, Aug. 6, 1987, abandoned, which is a continuation of Ser. No. 629,123, Aug. 14, 1984, Pat. No. 4,685,398.

[51] Int. Cl.$^5$ ............................................. B61K 1/00
[52] U.S. Cl. ................................... 104/88; 104/130
[58] Field of Search ............... 104/18, 20, 26.1, 88, 104/118–120, 130, 242, 248, 284, 293; 180/168; 318/587; 246/5, 4

[56] References Cited

U.S. PATENT DOCUMENTS

| | | | |
|---|---|---|---|
| 951,698 | 3/1910 | Poole | 104/248 |
| 1,001,170 | 8/1911 | Sayer | 104/18 |
| 2,194,057 | 3/1940 | Simpson | 104/26 R |
| 3,118,392 | 1/1964 | Zimmerman | 104/88 |
| 3,249,065 | 5/1966 | Adams et al. | 104/299 |
| 3,368,496 | 2/1968 | Falk et al. | 104/18 |
| 3,403,634 | 10/1968 | Crowder | 104/88 X |
| 3,537,401 | 11/1970 | Metzner | 104/299 |
| 3,552,321 | 1/1971 | Priebe | 104/18 |
| 3,593,668 | 7/1971 | Adams | 104/130 |
| 3,613,599 | 10/1971 | Seidman | 104/18 |
| 3,661,092 | 5/1972 | Morley et al. | 104/299 |
| 3,661,093 | 5/1972 | Searle | 104/299 |
| 3,727,560 | 4/1973 | Blemly et al. | 104/287 |
| 3,759,187 | 9/1973 | Gayot | 104/130 |
| 3,771,463 | 11/1973 | Smoot et al. | 104/155 |
| 3,788,232 | 1/1974 | Schneider et al. | 104/88 |
| 3,823,673 | 7/1974 | Wesener | 104/299 |
| 3,831,527 | 8/1974 | Peterson | 104/130 |
| 3,839,964 | 10/1974 | Gayot | 104/18 |
| 3,845,719 | 11/1974 | Langdon | 104/130 |
| 3,861,317 | 1/1975 | Crowder | 104/88 |
| 3,895,584 | 7/1975 | Paddison | 104/88 |
| 3,913,491 | 10/1975 | Auer, Jr. et al. | 104/130 |
| 3,933,099 | 1/1976 | Sieb | 104/88 |
| 4,018,410 | 4/1977 | Renaux | 246/5 |
| 4,083,309 | 4/1978 | Gerard | 104/18 |
| 4,090,452 | 5/1978 | Segar | 104/247 |
| 4,176,609 | 12/1979 | Allen | 104/88 |
| 4,232,611 | 11/1980 | Uozumi | 105/215 R |
| 4,284,160 | 8/1981 | DeLiban et al. | 180/168 |
| 4,296,901 | 10/1981 | Perrott | 246/167 R |
| 4,658,731 | 4/1987 | Schumann | 104/121 X |
| 4,685,398 | 8/1987 | Kissel, Jr. | 104/88 |

FOREIGN PATENT DOCUMENTS

| | | | |
|---|---|---|---|
| 2530938 | 1/1977 | Fed. Rep. of Germany | 318/587 |
| 2639430 | 3/1977 | Fed. Rep. of Germany | 104/18 |
| 1170761 | 11/1969 | United Kingdom | 104/20 |

Primary Examiner—Robert J. Oberleitner
Assistant Examiner—S. Joseph Morano
Attorney, Agent, or Firm—Jones, Askew & Lunsford

[57] ABSTRACT

A comprehensive transportation system with the ability to transport an individual passenger or a unit of cargo directly from a point of origin to a desired destination. A plurality of vehicles are directed about a network of continuous guideways. The guideways include a raised guide rail and are connected by a plurality of closed loop interchanges. Each vehicle is fitted with a guide rail shoe which facilitates operation of the vehicle on the guideway. The guide rail shoe tracks the raised guide rail, and comprises a switching device that transfers a vehicle from one continuous guideway to another. The guideways are further defined by level-of-service zones. The integrity of each zone is maintained electronically by an operations center and mechanically by a level-of-service screening key.

4 Claims, 12 Drawing Sheets

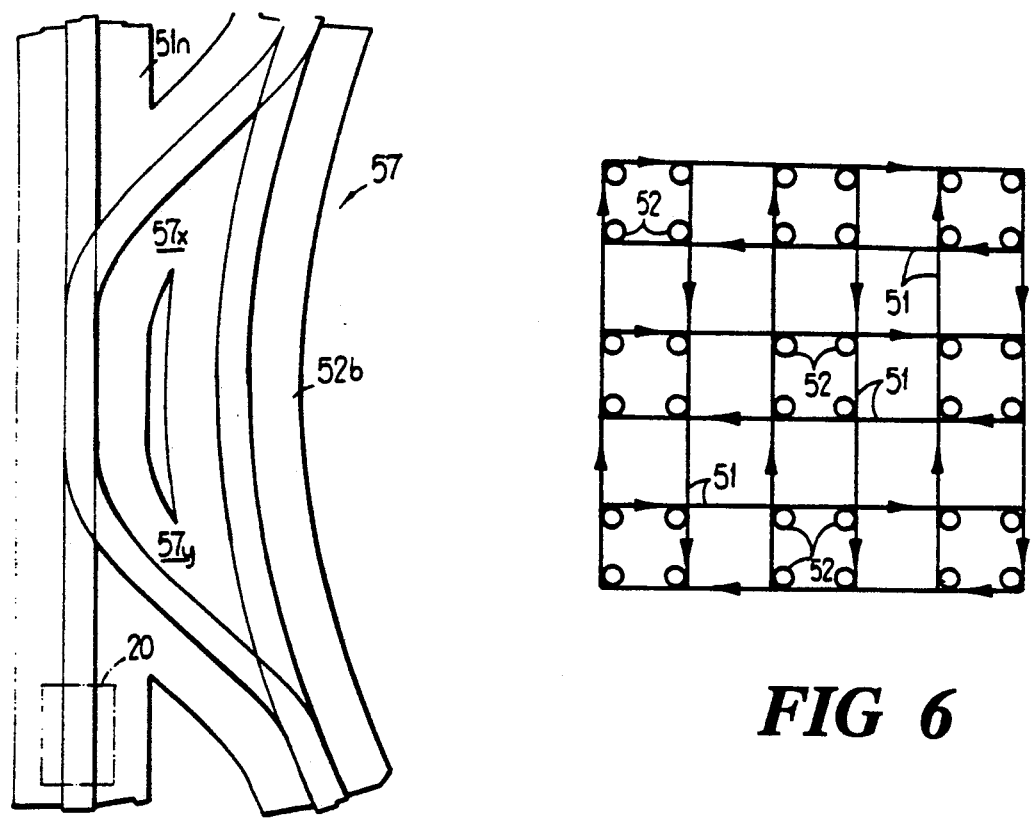
FIG 5A
FIG 6
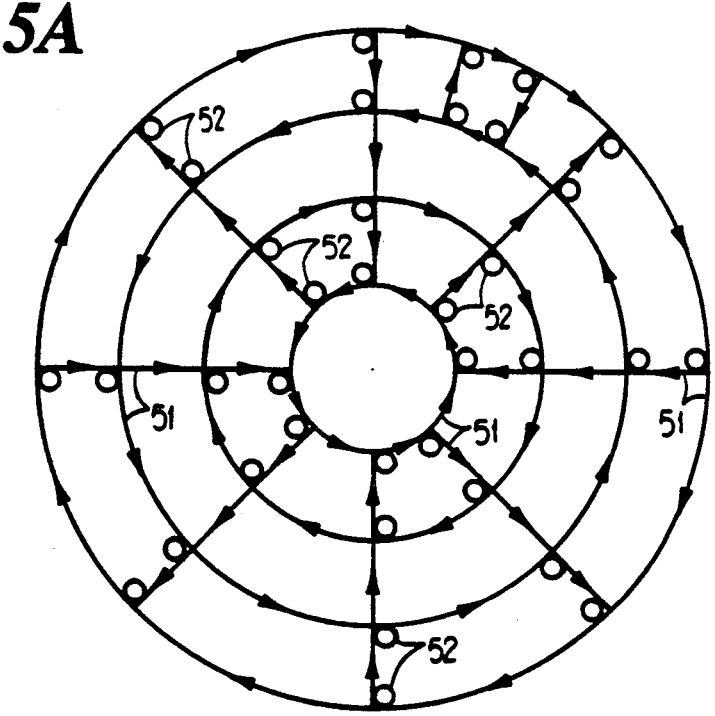
FIG 7

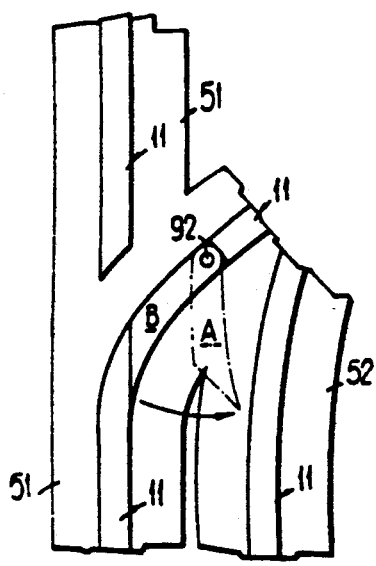
FIG 11
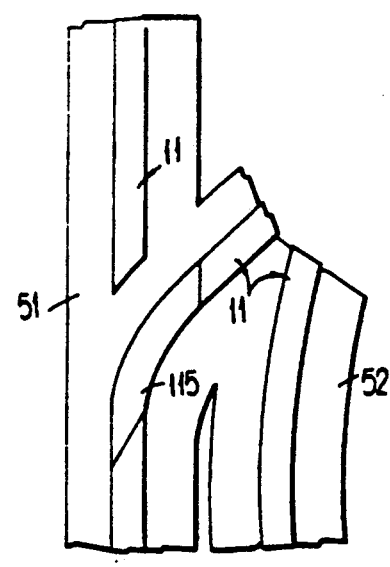
FIG 13
FIG 14
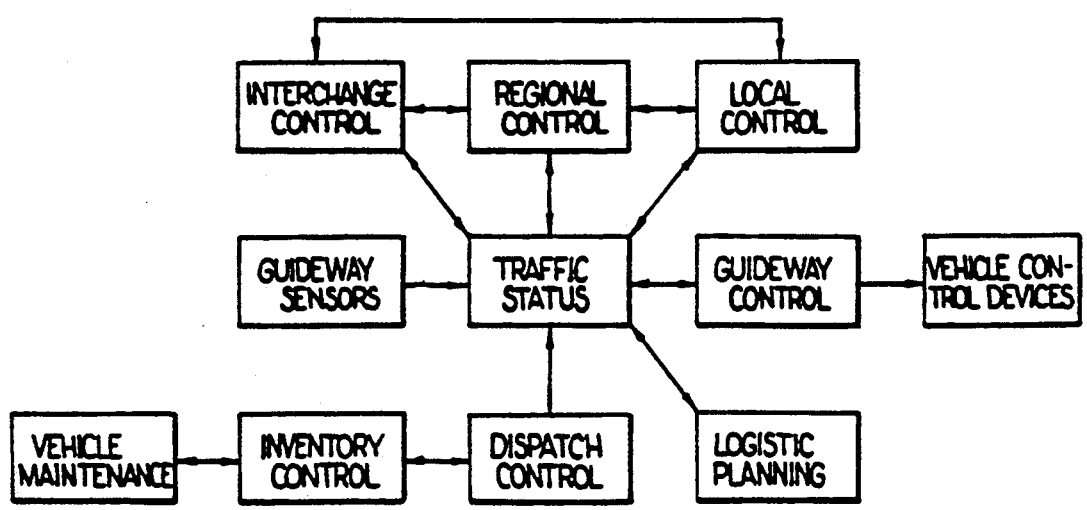

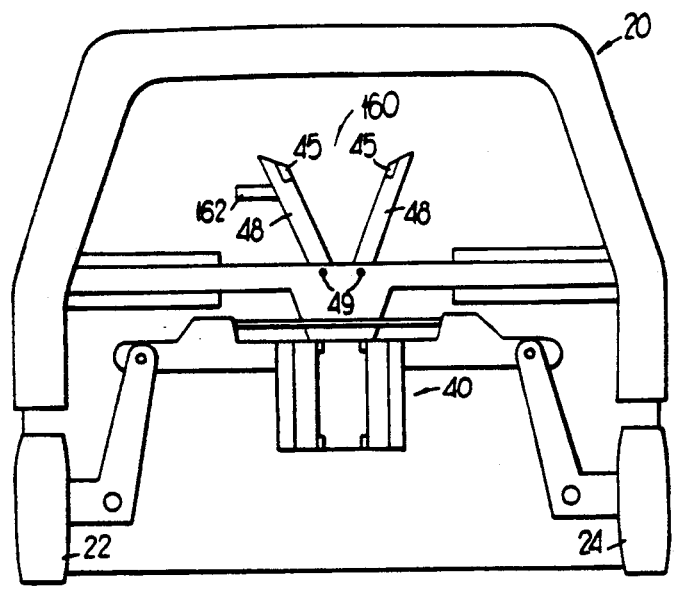
FIG 15
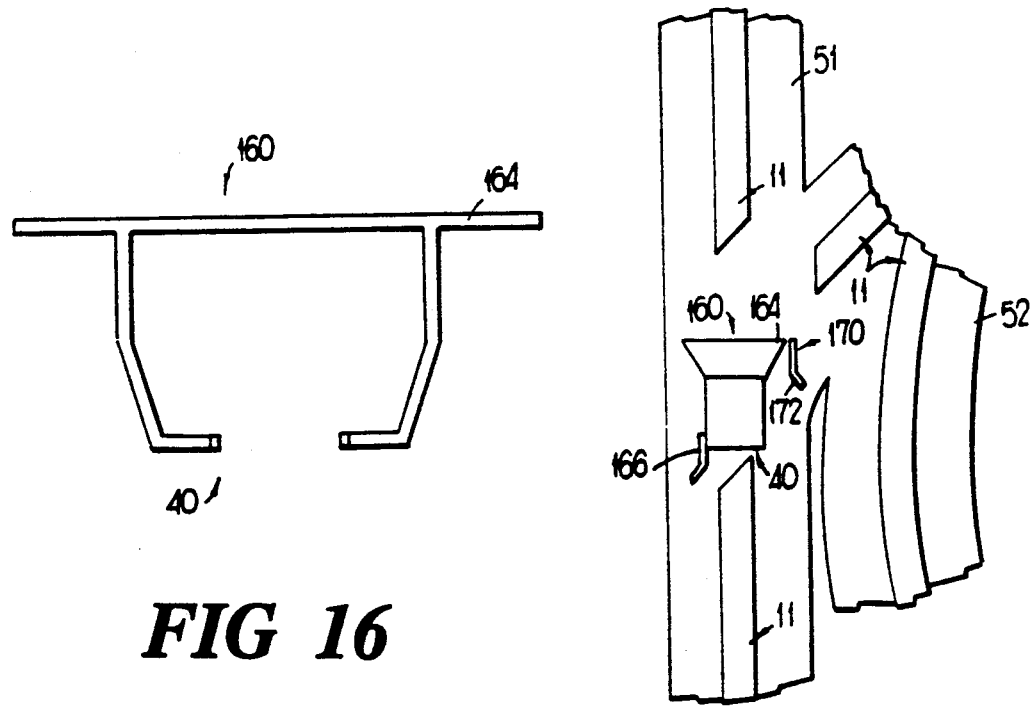
FIG 16
FIG 17

COMPREHENSIVE UNIT TRANSPORATION SYSTEM

This application is a continuation-in-part of U.S. patent application Ser. No. 082,839 filed Aug. 6, 1987, and now abandoned, which was a continuation of U.S. patent application Ser. No. 629,123 filed Aug. 14, 1984 issued Aug. 11, 1987 as U.S. Pat. No. 4,685,398.

TECHNICAL FIELD

The present invention relates to transportation, and more particularly, relates to a comprehensive unit transportation system wherein a plurality of vehicles are directed through a network of continuous guideways from a source point to a destination point.

BACKGROUND OF THE INVENTION

Various transportation systems are known in the prior art. Each such system constitutes a response to societal demands for quick, convenient and comfortable transportation. These responses may be classified as either mass/rapid transit systems or automotive transit systems.

A mass/rapid transit system is designed to serve a large population dispersed over a substantial land area. Examples of mass/rapid systems include airports, subways, railroads, bus lines and the like. These transportation systems are typically comprised of a variety of transportation vehicles including airplanes, buses, trains and like vehicles.

While they serve a useful function, several problems exist with mass/rapid transit systems. One problem is that travel is segmented. For example, a mass/rapid system passenger travels first to a station (often by means of the automotive transit system), then boards a transportation vehicle, then disembarks from this vehicle upon its arrival at the station nearest the desired destination point and then travels to his or her desired destination point. Thus, mass/rapid transit systems do not provide for a passenger to travel directly from a point of origin to a point of destination.

Another problem with mass/rapid transit systems is the stations themselves. Each station must provide access and exit for passengers and a variety of transportation vehicles. The problems of scheduling vehicles and passengers are inherent to mass/rapid transit systems. For example, passengers are often forced to wait for extended time periods before boarding or disembarking a vehicle. Other station related problems include the threat of criminal activity, inefficient space utilization, cargo flow both within and outside of the station and the need for support systems such as food service, rest room facilities and the like. It is not surprising that bus terminals, airports and the like are viewed as obstacles to travel by the general public.

Yet another problem with mass/rapid transit systems is that the transportation vehicle makes frequent stops at various stations to board or disembark passengers. For the passenger whose desired destination is beyond such stops, time is wasted as he or she waits for other passengers to enter or exit the system at intermediate stations. Furthermore, and perhaps because of the above-described problems, no economically self-sufficient rapid/mass transit system has been developed. Tax subsidies are universally required from local, state and federal governments to finance continued operation of these systems.

An automotive transit system differs from a mass/rapid transit system in that it is a unit transportation system. The primary advantage of the automotive transit system is its ability to move a passenger or passengers and cargo directly from point of departure to point of destination with stops necessitated only by the operating requirements of the vehicle. Automotive transit is a primary means of transportation within residential areas and small communities as well as within large regional areas. The public's desire for automotive transit has been vividly demonstrated by its continued and extensive use of automobiles, even in times of soaring fuel prices.

Several problems also exist with automotive transit systems. An extensive and elaborate network of roadways provide a seemingly infinite number of intersections. Each intersection represents an area of high accident risk to both vehicles and passengers. A related problem is two-way street traffic. Ideally, traffic of conflicting directions would be separated to the greatest possible degree. Yet another problem is that the automotive transit system depends extensively on the human interface. Many accidents are the result of errors in judgment by the driver resulting from driver fatigue, driver intoxication, etc.

The ideal transportation system, heretofore unknown in the prior art, would include the beneficial aspects of a mass/rapid transit system and an automotive transit system. In particular, the ideal transportation system would move a passenger and/or cargo directly from a point of departure to a point of destination within the shortest possible distance of travel at the fastest practical velocity with the fewest possible delays. To fulfill those goals, traffic flow in the ideal transportation would be constant and unidirectional, and conventional intersections would be entirely avoided.

The ideal transportation system would additionally provide service as required. For example, it would be able to service small local communities as well as major metropolitan areas. Finally, human error would be removed from any such system to the greatest degree possible, and the system would be self-sufficient to provide an economical means of transportation. Yet further, the ideal transportation system would function efficiently under conditions of high utilization, as opposed to the automotive system that bogs down under such conditions. Finally, those skilled in the art will appreciate that the above discussed factors of distance, velocity and delay each impact on the ultimate consideration of time. The ideal transportation system would move both passengers and cargo from a point of origin to a point of destination in the least amount of time.

SUMMARY OF THE INVENTION

The present invention solves the above-described problems in the prior art by providing a comprehensive unit transportation system which provides quick and convenient transportation from any addressable source to any addressable destination. The present invention further provides a constant, continuous and unidirectional flow of vehicles upon a comprehensive network of continuous guideways designed to eliminate conventional intersections and the problems associated therewith. The emphasis of a comprehensive unit transportation system according to the present invention is to provide safe, yet rapid and continuous traffic flow upon a novel network of continuous guideways so as to transport a passenger and/or cargo directly from a point of departure to a point of destination. Stated more particularly, the emphasis of a comprehensive unit transportation system according to the present invention is to transport passengers and cargo safely from a point of origin to a point of destination within the shortest time possible by traveling the shortest possible distance of travel at the fastest practical speed with the fewest possible delays.

Generally described, the present invention comprises a network of continuous through guideways and continuous transfer guideways interconnecting the through guideways, a plurality of vehicles suitable for operation upon the guideways, and means for controlling and directing the vehicles through the network of guideways whereby an individual vehicle is directed and travels continuously from a point of origin to a point of destination.

Described more particularly, the present invention is characterized by an ability to transport an individual passenger or a unit of cargo directly and continuously from a point of origin to a point of destination. A plurality of specially constructed, self-propelled vehicles are provided that travel unidirectionally about a network of through and continuous transfer guideways. A third type of guideway, labeled a guideway segment, is provided. A guideway segment is not continuous in that it connects a point-of-origin or a point-of-destination to a continuous through guideway or a continuous transfer guideway. The guideways comprise a grid pattern that enables the vehicles to move non-stop at substantially constant and discrete speeds. The guideways are characterized by a multiple width paved surface and a single raised guide rail. The type of vehicle together with the type of guideway influence the speed at which a vehicle may travel.

The through guideways are connected by a plurality of continuous transfer guideways configured to eliminate conventional intersections. Each vehicle regardless of construction, is fitted with a guide rail shoe that interacts and cooperates with the raised guide rail to direct the vehicle upon a guideway. The guide rail shoe tracks the raised guide rail, and provides an electromechanical switching device that transfers a vehicle from one continuous guideway to another continuous guideway. The guide rail shoe is further characterized by varying stages of steering sensitivity.

The present invention further provides for discrete level-of-service zones within the network of continuous guideways. Vehicles are segregated within these zones according to size, speed, and other like characteristics, as well as the type of guideway upon which the vehicle is traveling. The integrity of a particular zone is maintained electronically by an operations center and mechanically by a level-of-service screening key.

Thus, it is an object of the present invention to provide an improved transportation system that includes and combines the beneficial aspects of a mass/rapid transit system and an automotive transit system.

It is a further object of the present invention to provide a comprehensive unit transportation system having a network of continuous and segmented guideways upon which a plurality of vehicles move unidirectionally at constant speed without stopping.

It is a further object of the present invention to provide a comprehensive unit transportation system having a network of continuous through guideways connected by a plurality of continuous transfer guideways to eliminate conventional intersections.

It is a further object of the present invention to provide a comprehensive unit transportation system which utilizes a variety of ground transportation vehicles operating on a variety of stationary guideways with a distinct level of service zones to transport passengers or cargo directly from a desired point of departure to a desired point of destination.

It is a further object of the present invention to provide a comprehensive unit transportation system that avoids the disadvantages of, but interacts with, present mass/rapid transit systems, and can deploy its own mass/rapid transit vehicles.

It is yet a further object of the present invention to avoid the disadvantages of present automotive transit systems, yet include and adopt the beneficial aspects thereof.

It is a further object of the invention to provide a comprehensive unit transportation system that places a high priority upon the safe and rapid transportation of passengers and cargo.

It is a further object of the present invention to provide a comprehensive unit transportation system that optimizes the time required to get from a point of origin to a point of destination; the parameters of time being defined as the minimum distance of travel at the fastest practical speed with the minimum delay in transit.

It is a further object of the present invention to provide a comprehensive unit transportation system that operates at the same degree of performance when operating near or at maximum capacity as when operating at a low level of capacity.

It is a further object of the present invention to provide a comprehensive unit transportation system with an interchange for an automated transportation system wherein through traffic on any given guideway may enter or exit a continuous transfer guideway by means of a switching mechanism without said vehicle being required to reduce substantially its velocity.

It is a further object of the present invention to provide a comprehensive unit transportation system wherein vehicles traveling on a continuous transfer guideway and passing through any switching position of an interchange may pass simultaneously vehicles traveling on a continuous transfer guideway and passing through any switching position of an interchange may pass simultaneously vehicles traveling along a continuous through guideway within the switching position that these vehicles may pass side by side with no collision or interference.

It is a further object of the present invention to provide a comprehensive unit transportation system that avoids accumulating vehicles on a transfer guideway as said vehicle awaits an opportunity to merge onto a congested through guideway.

It is a further object of the present invention to provide a comprehensive unit transportation system that secures vehicles to the guideway, such that there is positive physical control of every vehicle at all times. Vehicles are secured to the guideway during atypical environmental conditions; including the guideway during disruption of normal function or equipment failure; including a power failure shutting down guideway controls, failure of a switching mechanism, or temporarily distorting vehicle guidance by striking a guideway and criminal efforts to remove vehicles forcibly from a guideway and securing the vehicle against falling off of a guideway during a collision with other vehicles or objects obstructing a guideway.

It is a further object of the invention to provide a comprehensive unit transportation system including systems whereby appropriately equipped vehicles track or follow the guideway and maintain a predetermined position and/or speed.

It is a further object of the invention to provide a comprehensive unit transportation system including means for switching a vehicle from one guideway to another in a safe, fast and reliable manner.

It is a further object of the invention to provide a comprehensive unit transportation system including means of control between a guideway and a vehicle such that a vehicle may internally monitor the space between itself and vehicles ahead of and behind it, and may internally monitor and adjust its position relative to other vehicles when it is transferring from one guideway onto another.

It is a further object of the present invention to provide an interchange for an automated transportation system such that through traffic on any given guideway may exit onto a continuous transfer guideway through a switch mechanism at an interchange without said vehicle being required to reduce its velocity and without said vehicle having to be concerned about the position or movement of other vehicles on the continuous transfer guideway.

It is a further object of the present invention that said vehicle may travel on the continuous transfer guideway to another switching mechanism and merge back onto a through guideway again without reducing velocity or having to consider the possibility of collision with another vehicle already on the guideway.

It is a further object of the present invention that the relationship of the continuous transfer guideway to the through guideways with which it is associated via a switching mechanism is such that vehicles traveling on the continuous transfer guideway and passing through any switching position simultaneously while vehicles from a through guideway are simultaneously passing through the same switching position that these vehicles may pass side by side with no collision or interference.

It is a further object of the present invention to provide a switching mechanism which will effectively render a complete physical separation between a through guideway and a continuous transfer guideway so that on those occasions when two vehicles, one on a transfer guideway and one on a continuous transfer guideway are in relative positions with each other where a collision would occur if due to some malfunction either vehicle was ordered to exit or merge or either vehicle attempted to exit or merge at that precise moment then nothing would or could happen, because under that circumstance there would be no direct pathway available, there would be no linkage (in effect) between either guideway for all practical purposes they would be two separate and distinct guideways passing through the switching mechanism.

It is a further object of the present invention that to avoid accumulating vehicles on the transfer guideway awaiting an opportunity to merge onto a busy transfer guideway or to avoid disallowing vehicles exiting a through guideway onto a continuous transfer guideway because of a vehicle passing through or entering into the proximity of a switching mechanism and further, without compromising the earlier objectives, a provision shall be made to allow a slight discontinuity in the constant velocity of any given selected vehicle on the continuous transfer guideway to allow it to be aligned so as to be able to merge onto a transfer guideway the first time it has the opportunity, and to allow vehicles on the transfer guideway to exit onto a continuous transfer guideway without being required to proceed to another interchange. A velocity discontinuity of less than five percent (5%) is anticipated.

It is a further object of the present invention to provide a computer controlling the entire interchange such that vehicles are identified and caused to exit, merge, modify velocity, or proceed with no change, exit for refueling, servicing, repair, parking, monitor all sensors, and operate switching mechanism and whatever else may be necessary to operate the interchange in accordance with its objectives.

Many other objects, features and advantages of the present invention will become apparent from a reading of the following specification when taken in conjunction with the accompanying drawings.

BRIEF DESCRIPTION OF THE DRAWINGS

FIG. 5A is a top plan view of an embodiment of a guideway switching junction according to the present invention.

FIG. 6 is a diagrammatic view of an embodiment of a closed loop interchange configuration according to the present invention.

FIG. 7 is a diagrammatic view of an embodiment of a closed loop interchange configuration according to the present invention.

FIG. 11 is a top elevational view of an embodiment of a lateral guideway mounted switching mechanism.

FIG. 13 is a top elevational view of an embodiment of a retractable guideway mounted switching mechanism.

FIG. 14 is a diagrammatic view of the flow of information through an embodiment of an operations center according to the present invention.

FIG. 15 is an underside view of a vehicle according to the present invention including an embodiment of a vehicle mounted level-of-service screening key.

FIG. 16 is a front elevational view of a guide rail shoe including an alternative embodiment of a vehicle mounted level-of-service screening key.

FIG. 17 is a top elevational view of a guide rail shoe including embodiments of the vehicle mounted level-of-service screening keys.

DETAILED DESCRIPTION

Referring now in more detail to the drawings, in which like numerals indicate like parts throughout the several views, the present invention is described herein in detail, with particular reference to the preferred embodiments thereof.

A comprehensive unit transportation system according to the present invention includes one or more of the following basic concepts: (1) a stationary surface roadbed including a raised guide rail; (2) a plurality of vehicles, each including a guide rail shoe; (3) a guideway network configuration; (4) level of service zoning; and (5) vehicle control mechanisms. It will be appreciated that these concepts have many applications outside the scope of the present disclosure. Thus, these concepts are illustrative of the preferred embodiment, and may be modified without limiting the scope of the present invention as defined in the claims appended hereto.

STATIONARY ROADBED SURFACE INCLUDING RAISED GUIDE RAIL

Figure 1:
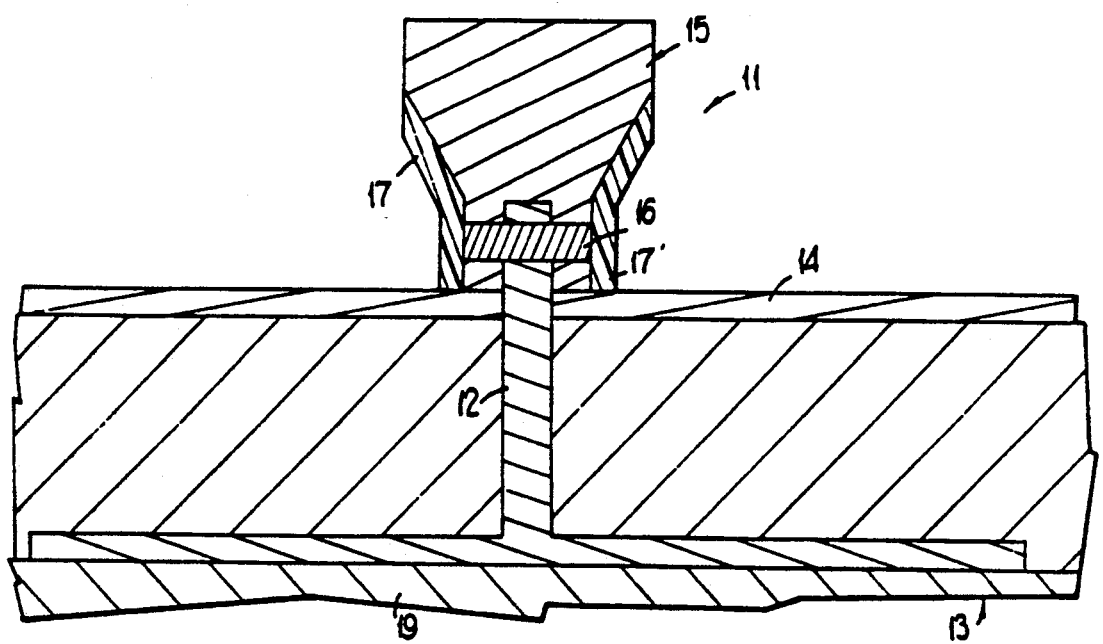
FIG. 1 is a cross-sectional view of an embodiment of a raised guide rail according to the present invention.

A primary structural component of a unit transport system according to the present invention is a stationary roadbed surface including a raised guide rail. The raised preferred guide rail shown generally at 11 in FIG. 1. The preferred raised guide rail 11 includes an anchor member 12 which is embedded within a roadway 13. The roadway 13 includes a paved vehicle support surface 14. The preferred anchor 12 may be formed of any material of suitable strength and weight to support the rail 11. Suitable materials include, but are not limited to, steel, cast iron, and aluminum. As shown in FIG. 1, the anchor 12 appears as an inverted "T" member. A portion of the vertical extension of the anchor 12 extends above the paved surface 14 of the roadway 13 to operatively engage a surface component 15 of the raised guide rail 11. The surface component 15 of the raised guide rail 11 preferably comprises an elongate T-shaped member, the base of which rests on the paved surface 14 of the roadway 13. The vertical extension of the anchor 12 is fitted through a bored opening (not shown) in the base of the surface component 15. The surface component 15 may be tapered, but is preferably formed so that its base is formed of a reduced cross-sectional area relative to the outwardly extending upper portion thereof. Such a construction prevents a vehicle from inadvertently moving off the guide rail 11. It will be appreciated that various shapes may be provided and retain this benefit of the preferred surface component 15.

The raised guide rail 11 serves three basic purposes. First, as noted above and described in greater detail hereinbelow, the preferred guide rail 11 provides a safety feature in that it prevents a vehicle tracking the guide rail from leaving the guideway during a power failure or a like interruption of normal operating procedure. Second, even when the system is operating normally, the preferred guide rail 11 construction prevents a vehicle from derailing or jumping off the guideway as a result of adverse environmental conditions such as ice, snow, mud or wind. Third, the preferred guide rail 11 configuration provides a security feature in that a vehicle cannot be stolen or otherwise removed from the guideway.

As further shown in FIG. 1, the surface component 15 of the guide rail 11 is secured to the anchor 12 by a pin 16. The pin 16 extends the width of the base portion of the surface component 15, and is inserted through a bored opening (not shown) in the uppermost portion of the anchor member 12 to secure the surface component thereto. A plurality of pins 16 and anchors 12 are positioned at suitable intervals along a section of guide rail 11 to insure a stable surface component 15. A contact wear surface 17 is affixed on opposite sides of the surface component 15. The contact wear surface 17 is preferably a thin protective surface that may be replaced when desired due to wear or breakage. Although it is not desired, the surface component 15 of the raised guide rail 11 may physically interact with a vehicle tracking the guide rail. The contact wear surface 17 facilitates this interaction in such a manner as to prevent direct harm to the surface component 15. The contact wear surface 17 is an elongate member which may be formed of any material suitable to withstand repeated contact as described below. Suitable materials include, but are not limited to, rubber, steel, aluminum, and plastic. The contact wear surface 17, as noted above, may be removably attached to the surface component 15 of the raised guide rail 11 to permit quick and simple replacement thereof. Such attachment means are conventional and well known and therefore need not be disclosed further herein.

Figure 2:
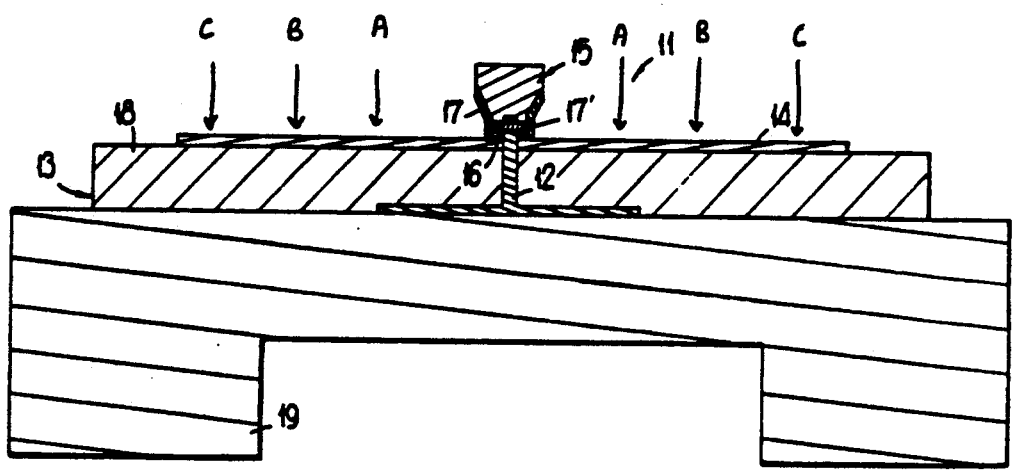
FIG. 2 is a cross-sectional view of an embodiment of a roadbed and raised guide rail according to the present invention.

Vehicles of varying size and weight utilize the raised guide rail 11. To facilitate such varied utilization, the present invention provides a guideway road bed 13 to support these vehicles. As shown in FIG. 2, the preferred road bed 13 is comprised of a paved surface 14, a first level sub-surface 18, and a second level sub-surface 19. The paved surface 14 may be formed of asphalt, concrete or any like material. As described in detail below, the preferred vehicles for use in the disclosed transportation system have wheelbases of four (4), six (6) or eight (8) feet. To protect the paved surface 14, wear surfaces may be provided for the 4 foot, 6 foot, and 8 foot portions of the guideway, designated as A, B and C in FIG. 2.

Further to the road bed 13, any conventional sealant may be employed to provide a constant and uninterrupted surface. The first sub-surface level 18 and second sub-surface level 19 may be any conventional aggregate base including crushed stone or the like. Since vehicles having a wider wheel base are substantially heavier in weight, a greater amount of compacted aggregate is provided in the second level 19 at the extremes of the roadway to support such heavier vehicles.

Thus, the preferred embodiment of the present invention provides a single raised guide rail 11 and a road bed 13 for use by a plurality of vehicles. The guide rail 12 comprises a surface component 15 secured flush to the paved surface 14 of the roadbed 13 by an anchor 12. It will be further seen, as described in detail below, that the guide rail 11 preferably does not guide a vehicle by physical restraint when operating under normal conditions. Instead, it provides a member that can be tracked by a vehicle-mounted sensing component referred to as a guide rail shoe.

VEHICLE DESCRIPTION, INCLUDING GUIDE RAIL SHOE

The raised guide rail 11 interacts with a vehicle by means of a guide rail shoe 40. Generally described, the guide rail shoe 40 comprises an electro-mechanical, vehicle-mounted steering component. Since the guide rail shoe 40 is common to each vehicle, regardless of configuration, it is described first. Detailed description of the vehicles 20 is provided thereafter.

Figure 3:
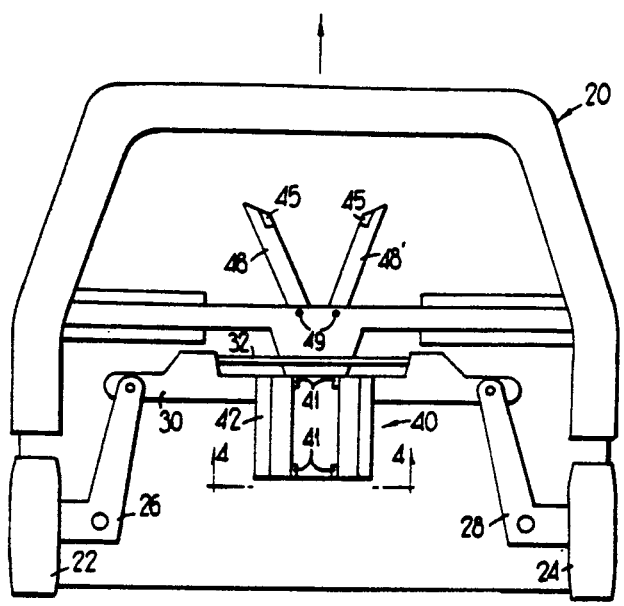
FIG. 3 is a bottom plan view of a vehicle including an embodiment of a guide rail shoe according to the present invention. The forward direction of the vehicle is toward the top of the page.

FIG. 3 shows the underside of a vehicle 20, with the direction of forward movement being denoted by the arrow. The vehicle 20 is provided with two front wheels 22 and 24. The front wheels 22 and 24 are manipulated by a steering mechanism which is shown only in part. The steering mechanism includes linkage members 26 and 28, and an interconnecting member 30. The interconnecting member 30 may further include a screw linkage member 32 for manipulating linkage members 26 and 28. It will be appreciated, however, that the steering mechanism may be formed of any conventional apparatus known in the art.

Functionally described, the preferred guide rail shoe 40 is an electro-mechanical, vehicle-mounted component which orientates the vehicle 20 on a guideway relative to the raised guide rail 11. The preferred guide rail shoe 40 is shown in FIGS. 4, 4A, 4B and 4C. The guide rail shoe 40 constantly locates the guide rail 11, and instructs the steering mechanism accordingly. The preferred embodiment of the guide rail shoe 40 comprises three stages of steering sensitivity: primary, secondary, and emergency backup. It will be appreciated that these three stages of steering sensitivity provide for the vehicle 20 to track or follow the guide rail 11.

Figure 4:
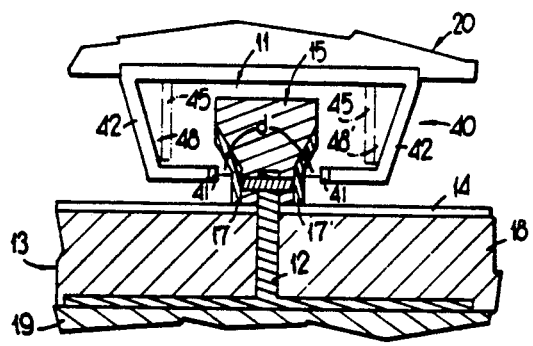
FIG. 4 is a cross-section view of the embodiment of the raised guide rail shoe shown in FIG. 3, taken along line 4—4.

The first level of steering sensitivity provided by the shoe 40 is primary steering. As shown in FIG. 3, four primary steering sensors 41 are located on a narrow throat section 42 provided at the rearward portion of the shoe 40. Such sensors may comprise "electronic eye" photocell assemblies, the technology of which the inventor considers well known and therefore, such sensing means need not be disclosed further herein. Of course, other optical-type sensors or the like could be used. FIG. 4 shows the shoe 40 in operative position with respect to the guide rail 11. As shown best therein, the throat section 42 is U-shaped and the sensors 41 are positioned on opposite sides thereof. As further seen in FIG. 4, one pair of primary sensors 41 rest on the opposite side of the surface component 15 of the raised guide rail 11 from the remaining pair of primary sensors 41.

In operation of primary steering, a desired separation distance is predetermined. This distance denotes the desired distance of separation between the sensors 41 and the surface component 15. Once a desired separation distance of acceptable safety is determined, it is programmed into an onboard microprocessor (not shown). The sensors 41 monitor the actual separation distance from each sensor to the surface component 15, and send constant information to the microprocessor detailing that actual separation distance to the predetermined desired separation distance, and instructs the steering mechanism to direct the vehicle in such a manner as to maintain the desired separation distance. Thus, it is to be understood that the microprocessor works with the steering linkage of the vehicle 20 so as to maintain constant distance between the sensors 41 and the guide rail 11. It is furthermore seen that the surface component 15 provides a tracking element which the guide rail shoe 40, and hence the vehicle 20, follow. It is to be further understood that the weight of the vehicle 20 is not borne by the guide rail 11 as in conventional train or monorail technology. Rather, the weight of the vehicle 20 is borne by the road bed 13. The guide rail 11 merely provides a tracking element which the vehicle follows, and preferably, the guide rail shoe 40 will not physically contact the guide rail 11.

The second level of steering sensitivity provided by the shoe 40 is secondary steering. Secondary steering becomes effective only when the primary steering sensors 41, acting in conjunction with the onboard microprocessor and the steering mechanism of a vehicle, are unable to guide the vehicle 20. For example, the rate of curvature per linear foot of guide rail 11 may be so great as to prevent the primary sensors from triggering the steering mechanism quickly enough to prevent contact of the guide rail shoe 40 with the guide rail 11. Thus, as shown in FIG. 3, the present invention provides secondary steering sensors 45 near the front of the vehicle 20 on two flared throat sections 48 and 48'. As with the primary steering sensors 41, the secondary sensors 45 may comprise "electric eye" photocell assemblies. Such technology is considered well known and therefore need not be disclosed further herein. As shown in FIG. 4, the secondary steering sensors 45 are positioned on the flared throat sections 48 and 48' so as to be located on opposite sides of the guide rail 11.

Operation of secondary steering is described by example. Assume that a vehicle 20 encounters such a sharp curve that the rate of curvature per linear foot of guide rail 12 exceeds the ability of the primary sensors 41 to manipulate the primary steering mechanism in response thereto. The secondary steering mechanism first overrides the primary steering mechanism by means of the onboard microprocessor. Once the actual separation distance deviates from the desired separation distance a sufficient predetermined amount the microprocessor automatically terminates the primary sensors 41 and activates the secondary sensors 45. (As with the desired separation distance, an unacceptable deviation distance is selected and programmed into the onboard microprocessor.) The second sensors 45 operate on the same basic principle as the primary sensors, namely, that of comparing the actual separation distance against a predetermined separation distance. Of course, an acceptable safety factor would be incorporated in any such predetermined separation distance. The flared relationship of the throat sections 48 and 48' increases sensor sensitivity by increasing the distance from the sensors to the rails. This permits the guide rail 11 to adopt a significant curvature without loss of steering capability. As further shown in FIG. 3, the flared throat sections 48 and 48' may be pivotally mounted abut a center shaft 49. The flared throat sections 48 and 48' are then capable of swinging outwardly from the guide rail 11 and thus, the pivotal mounting permits an even greater curvature of guide rail 11 to be readily compensated for by the secondary steering mechanism.

Secondary steering sensitivity is operative only when primary steering is incapable of directing the vehicle 20. Thus, once the guide rail 11 again adopts a relatively straight orientation, the secondary steering mechanism relinquishes control of the vehicle 20 and returns the steering responsibility to the primary sensors 41. Such relinquishment of control is conveniently accomplished by the onboard microprocessor.

The third level of steering sensitivity provided by the guide rail shoe 40 is emergency backup. This steering capability assumes control over a vehicle whenever primary or secondary steering become either inoperative or ineffective. For example, an electrical power failure within a vehicle could render the sensors 41 and 45 and the onboard microprocessor inoperable. Should this occur, the sensors 41 and 45 and the microprocessor will fail to instruct the steering mechanism of the vehicle 20. The predetermined separation distance will not be maintained and the guide rail shoe 40 will make physical contact with the raised guide rail 11. Even so, the U-shaped design of the raised guide rail shoe 40 provides a physical restraint that prevents the vehicle 20 from leaving the guide rail 11. Thus, assuming the vehicle 20 is capable of further travel, the guide rail shoe 40 will keep the vehicle on the roadbed 13 because the U-shaped design of the shoe prevents it from pulling free of the guide rail 11. If the vehicle 20 is incapable of further travel, the emergency backup steering mechanism will permit the vehicle to coast harmlessly to a stop.

It is to be understood that all vehicles according to the present invention include a guide rail shoe 40. Other common vehicular features are provided. For example, each vehicle may include electronic transmitting and receiving equipment. Such equipment would permit communication between any two vehicles and between a vehicle and an operations center (described in detail below). The transmitted information could be utilized to determine the distance between two vehicles or their relative speeds so as to maintain a safe operating distance therebetween. It is also to be understood that the usual manual tasks of steering, accelerating, braking and speed monitoring are performed automatically in response to electronic commands from within a vehicle or transmitted from the operations center. Vehicles according to the present invention therefore further include devices which respond to such instructions so as to automatically manipulate the vehicle according to these commends. Those skilled in the art will recognize that the potential for human error is thus reduced to provide a safer transportation system.

The present invention further provides vehicles of differing characteristics. Although such vehicles can otherwise be of conventional construction for travel on paved roadways, vehicles having the following characteristics are preferred for practice of the present invention:

Vehicle Type I—The preferred type I vehicle is designed for residential use only and capable of only fifteen miles per hour. This vehicle is very small, lightweight, and is preferably constructed having a four foot wheel base. A type I vehicle has a maximum passenger capacity of six persons.

Vehicle Type II—A type II vehicle is identical to a type I vehicle except it is capable of speeds up to thirty miles per hour. Both the type I and type II vehicles are designed for residential use.

Vehicle Type III—A type III vehicle is able to maintain speeds of up to sixty miles per hour, has a four foot wheel base, and a passenger capacity of six persons. However, this vehicle is not designed for extended travel. Its contemplated use is short-term, namely, over a regional area.

Vehicle Type IV—This vehicle is designed for extended travel, and is capable of speeds of up to one hundred miles per hour. Since extended travel is contemplated, various comfort and entertainment features are incorporated, the details of which are beyond the scope of this disclosure. A type IV vehicle has a preferred wheel base of six feet, a passenger capacity of 6 and is constructed so as to withstand extensive high speed usage. Conceptually described, this vehicle would represent "the family car".

Vehicle Type V—A type V vehicle is capable of speeds up to sixty miles per hour, has a seating capacity of fifty passengers and a wheel base of six feet. Thus, this vehicle would be used for rapid disbursement and collection of large groups of people over a regional or metropolitan area to provide a shuttle or similar type transportation service.

Vehicle Type VI—This vehicle is designed for long-distance travel. A type IV vehicle has a seating capacity of fifty passengers, and is capable of speeds up to one hundred miles per hour. A type VI vehicle is constructed having a six-foot wide wheel base and further includes restroom facilities, food/snack facilities, reclining seats, and like features.

Vehicle Type VII—A type VII vehicle is essentially a type VI vehicle. However, a type VII vehicle is constructed having an eight-foot wheel base.

Vehicle Type VIII—A type VIII vehicle is not designed for passengers. Rather, it is preferred that a Type VIII vehicle carry relatively light cargo over short distances. A type VIII vehicle is constructed having a four-foot wheel base and is capable of maintaining a speed of thirty miles per hour.

Vehicle Type IX—A type IX vehicle is also a cargo vehicle, but is designed for medium weight industrial loads. Primary considerations of a type IX vehicle are a maximum potential speed of sixty miles per hour and a six-foot wheel base.

Vehicle Type X—Yet another cargo vehicle, the preferred Type X vehicle is designed to carry heavy loads over substantial distances. Primary considerations of a type X vehicle are, therefore, a maximum potential speed of one hundred miles per hour and an eight-foot wheel base. Additionally, since operation of this vehicle is confined to industrial areas and to the long distance 100 m.p.h. guideways, a Type X vehicle may be allowed to carry great weights. For example, a Type X vehicle may be allowed a gross weight of up to 100,000 lbs.

Vehicle Type XI—A type XI vehicle is preferably a self-powered vehicle capable of being attached to and pulling one or more other smaller, non-powered cargo vehicles. Thus, a Type XI vehicle is somewhat like the locomotive of a train. A Type XI vehicle is preferably confined to those guideways permitting a speed of sixty (60) m.p.h. Of course, a more powerful vehicle could be provided to achieve a higher speed.

Vehicle Type XII—A type XII vehicle is preferably a self-powered vehicle similar to a Type XI vehicle for pulling one or more passenger vehicles. Because the type XII vehicle preferably transports passengers, it is designed to enter Regional Mass/Transit terminals (described below) and other passenger departure and destination points.

It will be appreciated that the straightforward construction of the guide rail shoe 40 permits its adaptation to any and each of the above-described vehicles. Thus, various modifications may be made in the above-described characteristics of any transportation vehicle without departing from the spirit and scope of the present invention.

Continuous Guideway Network Configuration

The present invention further provides a comprehensive network of continuous guideways. It is to be understood that vehicles 20 fitted with a guide rail shoe 40 travel about and within this network of continuous guideways. As described in detail hereinbelow, the continuous guideway network configuration provides a dynamic model or pattern of traffic flow wherein any particular vehicle travels constantly, continuously and unidirectionally through the network from a point of departure to a point of destination.

Figure 18:
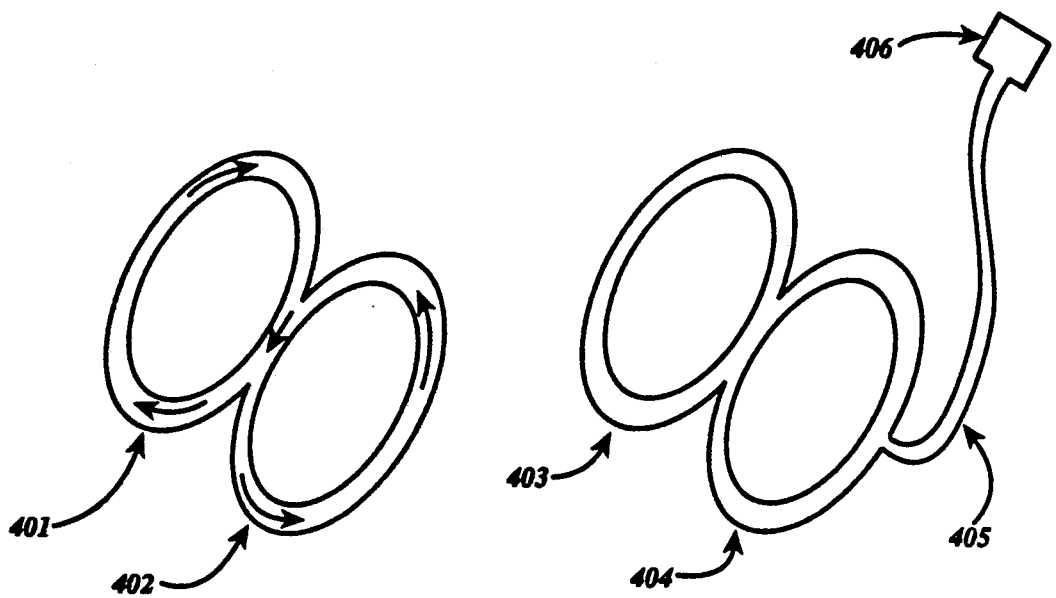
FIG. 18 is a diagrammatic view of a series of guideways and switching junctions.

The guideway network is comprised of three different types of guideways: (1) a through guideway; (2) a transfer guideway; and (3) a guideway segment. A through guideway is continous, discrete, stationary and unidirectional. A continuous guideway is defined as a guideway that has no beginning point or ending point. Referring to FIG. 18, it is seen that guideways 403 and 404 are continuous. Continuous guideways can take the shape of a circle, an ellipse, a square, a triangle, or be of no particular configuration. A discrete guideway maintains a separate identity along its length. Thus, if two guideways, continuous or otherwise, converge so as to form a point of tangency or such that less than two full widths exist, the guideways are no longer discrete. Thus, guideways 401 and 402 are not discrete, while guideways 403, 404 and 405 are discrete. A stationary guideway is fixed. Thus, as specified herein, the vehicles, regardless of type, are self-propelled. A unidirectional guideway is defined as a guideway upon which all traffic moves in one direction.

A transfer guideway is to be differentiated from a through guideway in that non-through traffic travels on the transfer guideway. The transfer guideway, functionally described, comprises a closed loop interchange whereby traffic is routed from one guideway to another.

Any guideway that is not continuous is a segment. For example, FIG. 18 shows a terminus guideway segment at 405, where the terminus 406 is defined as a point of destination. A terminus guideway segment 405 may access a continuous through guideway or a continuous transfer guideway or another guideway segment. Such access must be permitted by the level-of-service zoning requirement as specified hereinbelow. It is to be further understood that a vehicle (and, therefore, a passenger or cargo item) may start and stop, or enter and exit, the transportation system only at a terminus such as a point-of-origin or a point-of-destination.

A continuous guideway according to the present invention therefore includes a raised guide rail 11 projecting above a roadway 13 to interact with the raised guide rail shoe 40 as described above. The guideway is continuous in that it provides no physical stopping limitation. Thus, the preferred continuous guideway network configuration is devoid of any "dead ends", and "cul-de-sacs" or any other impediment to constant and continuous vehicular traffic flow.

Figure 5:
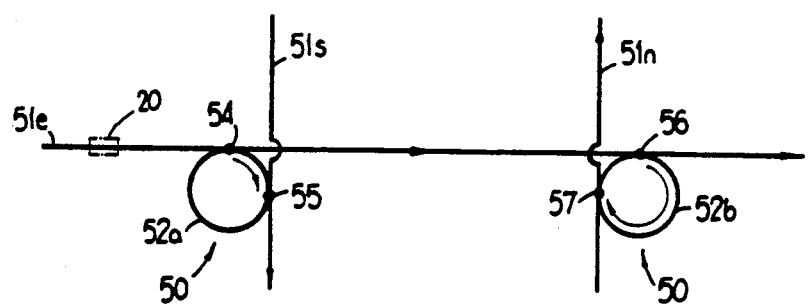
FIG. 5 is a diagrammatic view of an embodiment of a closed loop interchange configuration according to the present invention.
Figure 4A:
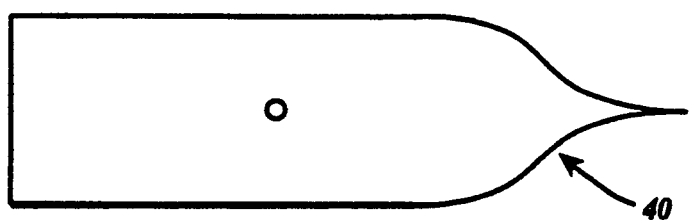
FIG. 4A is a top view of an embodiment of the guide rail show of the present invention illustrated in FIG. 4.
Figure 4B:
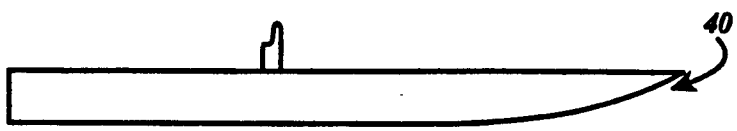
FIG. 4B is a side view of the embodiment of the guide rail shoe illustrated in FIG. 4A.
Figure 4C:
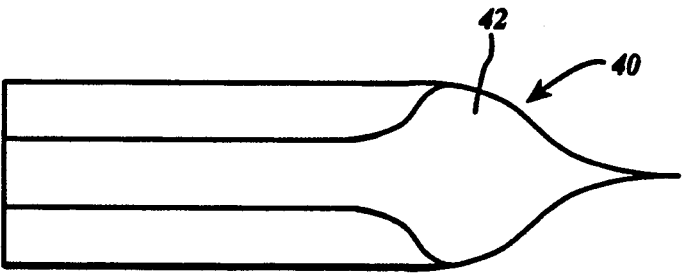
FIG. 4C is a bottom view of the embodiment of the guide rail shoe illustrated in FIG. 4A.

A primary element of the preferred continuous guideway network configuration is the closed loop interchange, shown generally at 50 in FIGS. 5, 6 and 7. The closed loop interchange 50 facilitates non-stop transfer of a vehicle from one continuous guideway to another by providing a transitional interface, or a point of tangency, therebetween. For example, the closed loop interchange 50 is shown in FIG. 5 as providing a transitional interface between several through traffic guideways 51. A through traffic guideway may be likened to a conventional limited access street or highway. The through traffic guideways in FIG. 5 have therefore been denoted according to the direction of vehicular travel thereon. Thus, all traffic on guideway 51$e$ travels easterly. Similarly, all traffic on guideways 51$n$ and 51$s$ travels north and south, respectively.

It is a principal concept of the present invention that, at any point of interface between two continuous guideways, there must be provided a merge junction and an accompanying exit junction. Implementation of this concept is found in the closed loop interchange 50. As shown in FIG. 5, each closed loop interchange 50 provides a continuous guideway loop 52$a$ and 52$b$. Continuous guideway loop 52$a$ includes two transitional interfaces 54 and 55 that, as described below, provide for vehicular transfer between through traffic guideways 51$e$ and 51$s$. Similarly, continuous guideway loop 52$b$ includes two transitional interfaces 56 and 57 that, as also described below, provide vehicular transfer between through traffic guideways 51$e$ and 51$n$. It is to be understood that, at each transitional interface, a vehicle may exit a through traffic guideway and enter a continuous guideway loop, or, a vehicle may exit a continuous guideway loop and enter a through traffic guideway.

Operation of the transitional interface or closed loop interchange 50 is described by example. FIG. 5 shows three primary guideways 51$e$, 51$s$ and 51$n$. As noted above, all vehicles on a continuous through guideway travel unidirectionally. Thus, all vehicles on guideway 51$e$ travel easterly, all vehicles on guideway 51$s$ travel south, and all vehicles on guideway 51$n$ travel northerly. Similarly, all vehicles on the guideways 52 travel clockwise. A vehicle, shown generally at 20 in FIG. 5, is moving in an easterly direction on primary guideway 51$e$, and is approaching a first interchange loop 52. It is assumed that the passengers in vehicle 20 wish to travel in a southerly direction along primary guideway 51$s$. To accomplish this change of direction, the vehicle 20 exits primary guideway 51$e$ at transitional interface 54, and enters the closed loop interchange 52$a$. The vehicle 20 continues on the interchange loop 52a until it reaches the transitional interface 55. At transitional interface 55, the vehicle 20 exits the interchange loop 52a, enters the primary guideway 51s, and travels thereon in a southerly direction.

As a yet further example, assume vehicle 20 is traveling easterly along primary guideway 51e, and the passengers therein desire to travel north on primary guideway 51n. The vehicle 20 would not exit at transitional interface 54 because such exit would direct the vehicle 20 onto primary guideway 51s as described above. To travel in a northerly direction, the vehicle 20 continues on primary guideway 51e past transitional interface 54 and under primary guideway 51s until it reaches transitional interface 56 of the second interchange loop 52b. To accomplish the desired directional change, the vehicle 20 exits primary guideway 51e at transitional interface 56 and enters the interchange loop guideway 52b. The vehicle 20 continues on the interchange guideway 52b until it reaches the transitional interface 57. At the transitional interface 57, the vehicle 20 exits the interchange loop 52b and travels in a northerly direction on primary guideway 51n.

Thus, it is seen that the term "closed loop interchange", as used herein, refers to a continuous transfer guideway that provides a transitional interface to facilitate vehicular transfer between other continuous guideways. As noted above, the transfer guideway includes an exit component and a merge component. This is visually described in FIG. 5A, which shows transitional interface 57. As shown therein, the continuous transfer guideway 52b tangentially interfaces with through traffic guideway 51n. An exit guideway 57x is provided to facilitate transfer of a vehicle 20 from the through traffic guideway 51n onto the continuous transfer guideway 52b. Furthermore, a merge guideway 57y is provided to facilitate transfer of a vehicle 20 from the continuous transfer guideway 52b to the through traffic guideway 51n.

A continuous transfer guideway according to the present invention further provides a traffic flow buffer zone. For example, should a through traffic guideway be inaccessible to a vehicle desiring to merge due to heavy or excessive utilization, the vehicle may be directed around the continuous transfer guideway until it can merge safely onto the through traffic guideway. This feature of the present invention prevents stopping due to normal or increased utilization of the system. Rather than permitting vehicles to stop and wait until merger is possible, a vehicle moves constantly about the continuous guideway loop.

To further increase the efficiency of traffic flow about the preferred network of continuous guideways, the present invention provides for traffic speeds on any particular continuous loop guideway to be modulated. As described in greater detail below, the speed of a vehicle or vehicles on a continuous guideway loop may be slowed slightly for a brief period of time to stagger the position of a vehicle on a continuous guideway loop relative to the position of a vehicle on a through traffic guideway. The result of this staggering is to provide an open position on the through traffic guideway of sufficient size to permit merger of the vehicle.

Figure 7A:
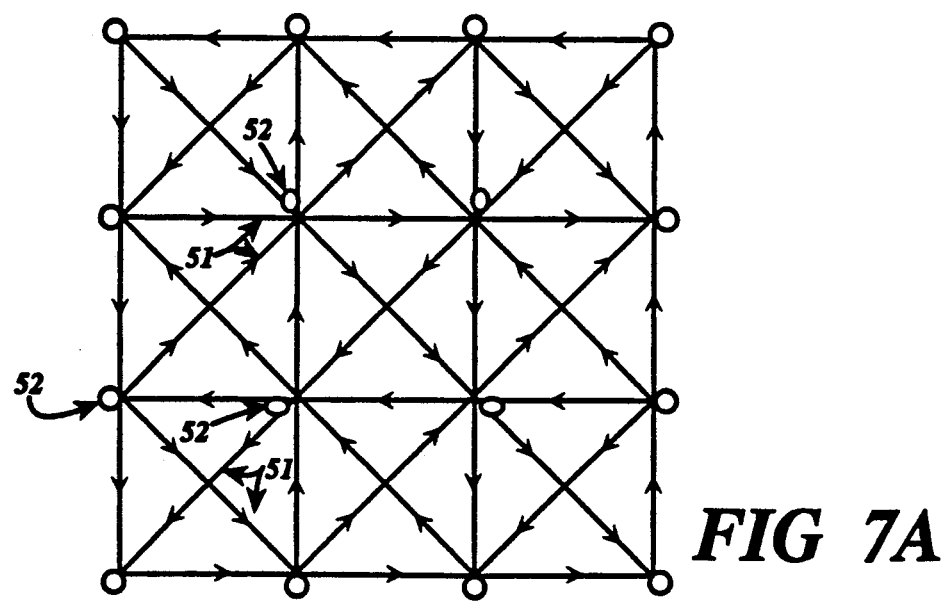
FIG. 7A is a diagrammatic view of an embodiment of a hybrid grid pattern utilizing a combination of triangularly and rectangularly arranged continuous guideways.

Several advantages of the present invention become immediately apparent. It will be appreciated that traffic flow on any continuous guideway is unidirectional. Thus, vehicles no longer require the mechanical capability of traveling in reverse. Furthermore, the hazards associated with two-way traffic flow on a single street in automotive transit systems are entirely eliminated. It will be further appreciated that no conventional intersections exist in the preferred continuous guideway network configuration. Thus, the potential for vehicle collisions as a result of intersecting lines of traffic flow is substantially minimized. Additionally, the transfer guideway renders conventional intersections unnecessary because an interface is provided to transfer vehicles between guideways. As shown in FIGS. 6 and 7, the closed loop interchange concept may be adapted to various traffic flow patterns. FIG. 6 shows adaptation of the continuous transfer and through guideway principle to a squared grid pattern. FIG. 7 shows further adaptation of the described principle to a circular grid pattern. FIG. 7A shows further adaptation of the described principle to a hybrid grid pattern utilizing a combination of triangularly and rectangularly arranged continuous guideways. It will be appreciated by one skilled in the art that the transfer guideway is a flexible concept readily adaptable to any number of situations to achieve the objectives of the present invention. The transfer guideway is thus adapatable to rural and urban areas alike.

The preferred continuous guideway network configuration further provides means for switching a vehicle from one guideway to another guideway. As noted above, a switching junction is provided, comprising a merge point and an exit point. The present invention provides two basic types of switching:

(1) vehicle mounted switching—switching action initiated by mechanical or electronic devices built into the vehicle; and (2) guideway mounted switching—switching action initiated by mechanical or electronic devices built into the guide rail.

The present invention further provides three types of vehicle mounted switching: (1) lateral, (2) inverted, and (3) free-float; and three types of guideway mounted switching: (1) lateral, (2) inverted, and (3) retractable.

VEHICLE MOUNTED SWITCHING

Lateral vehicle mounted switching is accomplished automatically onboard the vehicle. A vehicle approaching a transitional interface receives an electronic impulse either from the operations center (described below) or from a signal generator (not shown) within the passenger compartment of the vehicle. Thus, it will be appreciated that a vehicle may be directed either internally by a passenger or an onboard computing device, or remotely by an outside source. In operation, the electronic impulse translates into a command to the steering linkage of the vehicle, which proceeds to steer the vehicle to the right. To insure vehicle 20 switching, the flared jaws of the guide rail shoe 40 may be hinged on one or both sides thereof so that the raised guide rail 11 of the exit guideway engages the guide rail shoe 20 of the vehicle. Such a hinged assembly would insure vehicle switch even in the event of a steering malfunction. The guide rail shoe of the vehicle disengages from the primary guideway, and then locates and secures itself to an exit guideway. The vehicle then tracks the guide rail of the exit guideway as described above.

Figure 8:
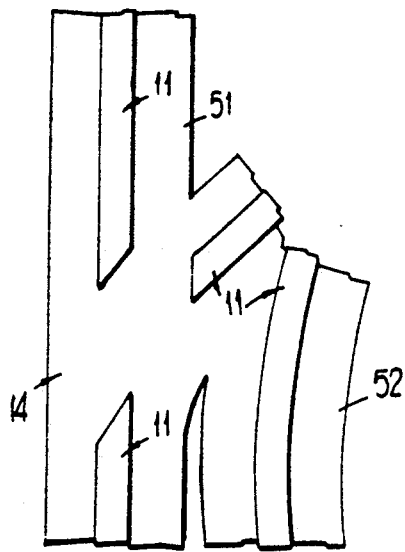
FIG. 8 is a top plan view of an embodiment of a guideway junction adapted for lateral vehicle mounted switching.

To facilitate such movement of the vehicle, the raised guide rail 11 of a primary guideway 51 is interrupted as shown in FIG. 8. In particular, the raised guide rail 11 of primary guideway 51 is interrupted diagonally to permit the wheels of an exiting vehicle to pass therethrough. Furthermore, without such an interruption of the raised guide rail 11, the emergency backup steering sensitivity of the guide rail shoe 40 would prevent any exiting of a vehicle 20 from the primary guideway 51. In a similar fashion, a separation is provided between the raised guide rail 11 of primary guideway 51 and the raised guide rail 11 of exit guideway 52. This separation permits the wheels of vehicles continuing to travel on the primary guideway to bypass the exit guideway 52. As noted above, the present invention provides vehicles having different wheel base widths. Thus, all such separations must be of sufficient dimension to facilitate passage of the largest vehicles. Of course, various modifications could be made. Even so, it is to be understood that this form of vehicle switching is accomplished by means of the guide rail shoe 40 secured to the underside of the vehicle 20.

Figure 9:
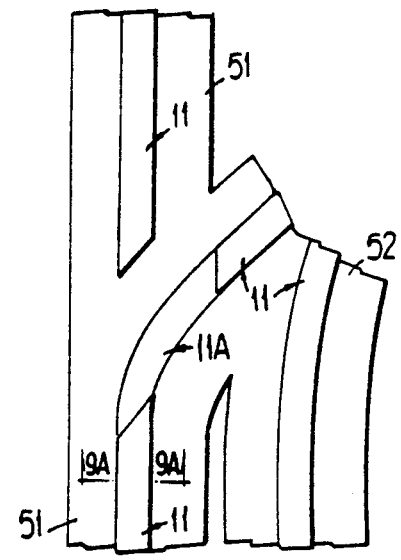
FIG. 9 is a top plan view of an embodiment of a guideway junction having a recessed guide rail adapted for inverted vehicle mounted switching.
Figure 9A:
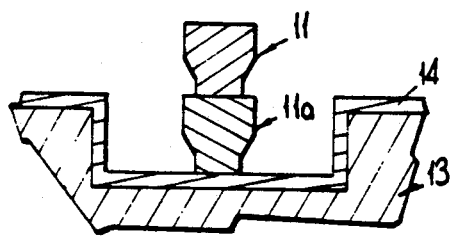
FIG. 9A is a section view of the embodiment shown in FIG. 9 taken along line 9A—9A.

Inverted vehicle mounted switching is also accomplished by means of an onboard component. As shown in FIG. 9, a raised guide rail 11 and a primary guideway 51 are provided as in the lateral vehicle mounted switching configuration shown in FIG. 8. Likewise, an exit guideway 52 is provided with a raised guide rail 11. However, the preferred configuration of guide rails for inverted vehicle mounted switching includes a second guide rail 11a, located immediately below the primary guide rail 11. The second, lowered guideway 11a connects the primary guideway 51 with the primary exit guideway 52. As shown in FIG. 9A, the second guide rail 11a is fixed in a depression at a position flush with the paved surface 14 of the guideways 51 and 52. Inverted vehicle mounted switching further includes a pneumatic cylinder (not shown) or like device in association with the raised guide rail shoe 40 which, when activated, causes the U-shaped shoe to move downwardly, and close about the lower guide rail 11a. Thus, the downward movement of the shoe 40 positions it about the second guide rail 11a. Once engaged on the second guide rail 11a, the shoe 40 then tracks the second guide rail 11a to effect the turn. Once the vehicle is on the exit guideway 52, the pneumatic cylinder or like apparatus releases and allows the guide rail shoe 40 to retract to its normal position as the guide rail 11a emerges from the recess to assume the height of the upper guide rail 11. It is thus seen that the vehicle 20 does not change its vertical position, but rather only the guide rail shoe 40 moves vertically. As in lateral vehicle mounted switching, the primary raised guide rail 11 is interrupted to permit the wheels of an exiting vehicle to pass therethrough. Vehicles continuing past the exit guideway 51 drive over the lower second guide rail 11a.

Figure 10A:
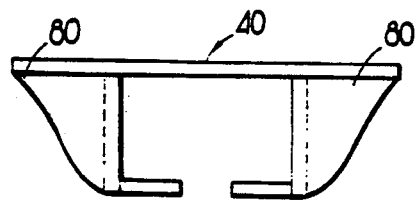
FIG. 10A is a front elevational view of the embodiment of a guide rail shoe shown in FIG. 10.
Figure 10:
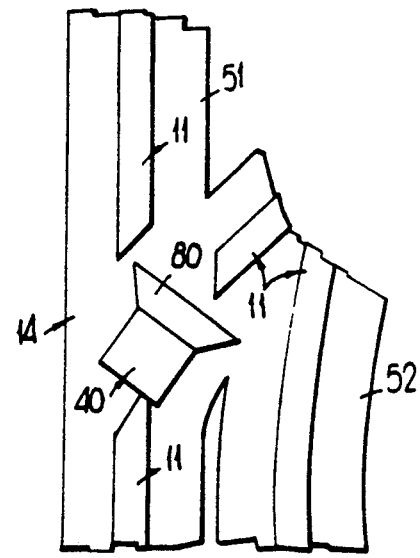
FIG. 10 is a top elevational view of an embodiment of a guide rail shoe fitted with an adapter for free float vehicle mounted switching effecting a guide rail change.

Free-float vehicle mounted switching is accomplished by an adapter designed for use with the guide rail shoe 40. As shown in FIGS. 10 and 10A, a guide rail shoe 40 is fitted with a flanged extension 80. The purpose of the flanged extension 80 is to coordinate a directional change by physical contact of the shoe 40 and the raised guide rail 11. Such means of effecting a directional change is required when emergency backup steering sensitivity is operative but could be used as the principal switching means. In operation, as the vehicle turns to the right, the flanged extension 80 catches and directs the shoe 40 onto the raised guide rail 11 of the exit guideway 52. Free-float vehicle mounted switching further includes a separation of the guide rails 11 as shown in FIG. 8 (lateral vehicle mounted switching). Described more particularly, assume a vehicle 20 is instructed to turn by the operations center. At the appropriate time, the steering mechanism of the vehicle 20 will direct the vehicle to the right. The shoe 40 will disengage from the primary guide rail 11. The concave shape of the flanged extension 80 coordinates association of the shoe 40 to the exit guide rail 11. As shown in FIG. 10, the left portion of the adapter 80 will catch and direct the shoe 40 onto the raised guide rail 11 of the exit guideway 52.

This method of switching is therefore readily likened to the emergency backup steering system wherein the actual physical components of the raised guide rail 11 and the raised guide rail shoe 40 serve to effect the change in direction. One skilled in the art will recognize that, as in emergency backup steering sensitivity, free-float vehicle mounted switching is not preferred since it represents a forced physical interface of the raised guide rail 11 and the guide shoe 40.

GUIDEWAY MOUNTED SWITCHING

A lateral guideway mounted switching mechanism according to the present invention is shown in FIG. 11. Lateral guideway mounted switching includes a hinged extension rail member 91 pivotally mounted upon a pin 92 at that end of an exit guideway 52 guide rail 11 nearest a primary guideway 51. The pivotal mounting of extension member 91 provides for lateral rotation thereof in a substantially horizontal plane. When no vehicle is exiting the primary guideway 51, the hinged extension member 91 appears in position A as shown in FIG. 11. Thus, vehicles bypassing the exit guideway 52 may do so without interruption or interference. To direct a vehicle onto the exit guideway 52, the hinged extension member 91 is pivoted into position B in FIG. 11. Such location of the hinged extension 41, in combination with either the primary, secondary or emergency backup steering mechanisms described above, serves to direct the vehicle onto the guide rail 11 of the exit guideway 52. After the vehicle has entered the exit guideway 52, the hinged rail extension member 91 pivots back to position A to permit other vehicles to bypass the exit guideway.

An inverted guideway mounted switching mechanism is shown in FIGS. 12, 12A, 12B, 12C, 12D, 12E, 12F, 12G, 12H, 12I, and 125J. The FIGS. 12B–J are cross-section views taken through the side view of the inverted guideway mounted switching mechanism illustrated in FIG. 12A. The inverted guideway mounted switching junction includes a raised security rail 201 provided on a first guideway 51. The junction further includes a recessed security rail 202 that is connected by a hinge 203 to a hinged rail switching segment 204. A lower recessed security rail 205 is provided forward of the recessed security rail 202. Forward of the lower recessed security rail is an exit recessed security rail 206. An exit raised security rail 207 is provided at the forwardmost portion of the guideway 51. A shoe canapy 208 is provided and operates as described in detail hereinbelow. These elements of the inverted guideway mounted switching junction are mounted with a channel 209 in the guideway 51. A second channel 210 is provided in the transfer guideway 52. A rail 211 is provided in guideway 52. The rail 211 is interrupted at 212 to permit clearance of the shoe 40 of a vehicle passing therealong, as described in greater detail hereinbelow. Finally, the inverted guideway mounted switching junction includes a hinged rail switching segment actuator arm 213.

In operation, a vehicle including a shoe 40 approaches the inverted guideway mounted switching junction. Upon entering the junction, the upper raised security rail 201 is guiding the vehicle. As the vehicle travels forward in the junction, the shoe is pulled downwardly onto the recessed rail 202. As the shoe 40 reaches the hinged rail switching segment 204, the shoe is retracted downward by activation of the hinged rail switching segment actuator arm 213. The shoe is thereby pulled further downward. The shoe then glides forward onto the lower recessed security rail 205. After the shoe has passed the hinged rail switching segment, the segment automatically returns to its initial position. As the vehicle and shoe 40 proceed further within the switching junction, the shoe locks about the lower recessed security rail 205 in channel 210. The shoe (and vehicle) then travel forwardly until engaging the raised guideway rail 211 of the transfer guideway 52. In making this transfer, the lower recessed security rail 205 rises gradually until it surfaces and guides the shoe 40 through the shoe clearance interruption 212 in the raised guide rail 211. The vehicle is thus directed onto the continuous transfer guideway 52 and travels accordingly.

Although a mechanical linkage is shown for activation of the hinged rail switching segment 204, a number of other devices could be employed, such as a solenoid operated plunger or a pneumatic driven plunger. Accordingly, it is a significant advantage of the inverted guideway mounted switching junction that initiation and effect of the transfer of the vehicle from one guideway to another may be initiated from the vehicle without assistance or direction from the guideway. Furthermore, in the event there is a malfunction and the shoe 40 does not engage the lower recessed security rail 205, no accident occurs because the shoe would be guided back up on to and engage the recessed security rail 206 and the vehicle would continue forward.

In addition, an actuator lock-up pin 214 may be provided. The actuator lock-up pin 214 can be forcibly engaged to the actuator arm 213 that activates the hinged rail switching segement 204. When this is effected, the actuator arm lock-up pin prevents the actuator arm from moving the hinged rail switching segment 204, making it impossible for the junction to operate accordingly. Thus, it is seen that a level-of-service zoning screening key can be readily provided for use with the present junction. Further discussion of the level-of-service zoning screening key is provided hereinbelow.

Figure 12K:
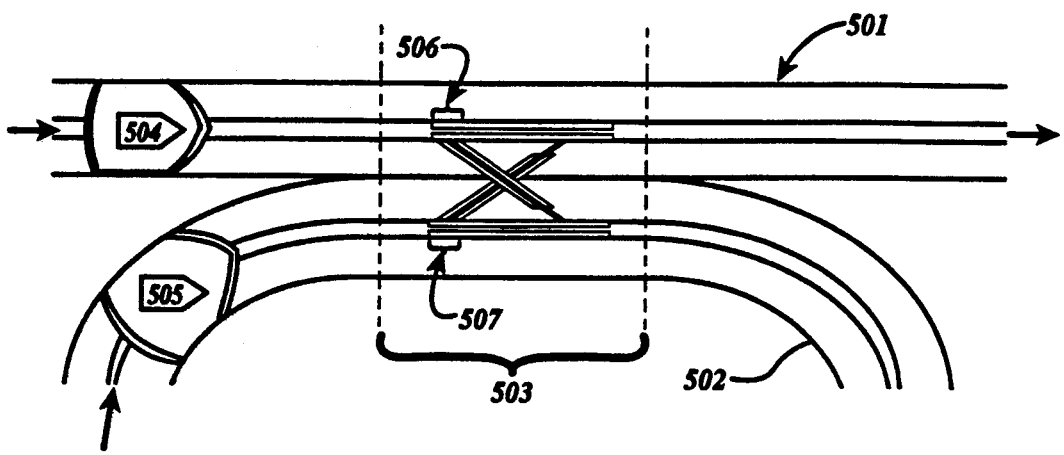
FIG. 12K is a top view of an embodiment of an inverted switching junction which provides a two-way interchange between a through guideway and a transfer guideway.
Figure 12A:
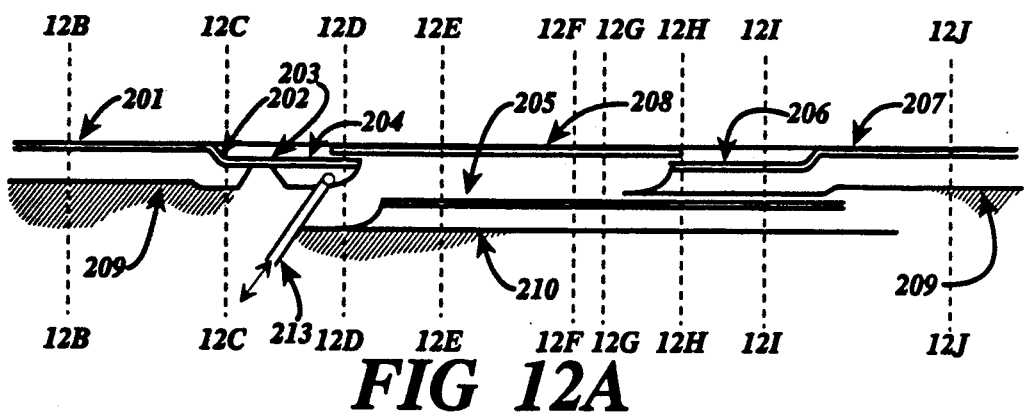
FIG. 12A is a side elevational view of an embodiment of an inverted guideway mounted switching mechanism.
Figure 12:
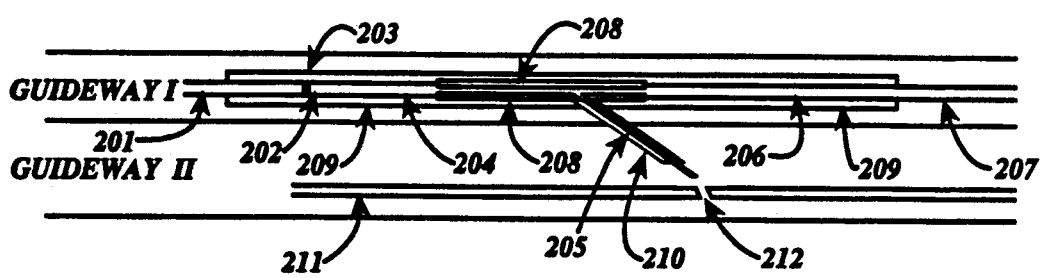
FIG. 12 is a side elevational view of an embodiment of an inverted guideway mounted switching mechanism.
Figure 12B:
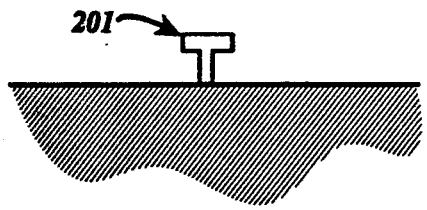
FIGS. 12B-J are a series of cross-section views taken through the side view of the inverted guideway mounted switching mechanism illustrated in FIG. 12A.
Figure 12C:
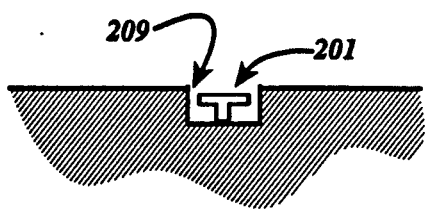
Figure 12D:
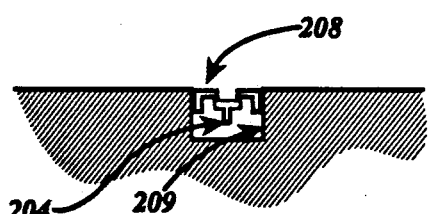
Figure 12E:
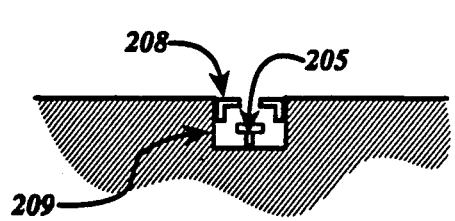
Figure 12F:
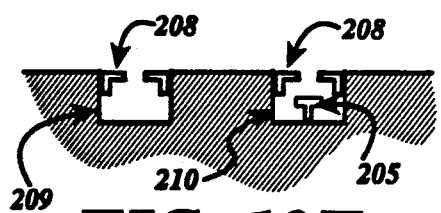
Figure 12G:
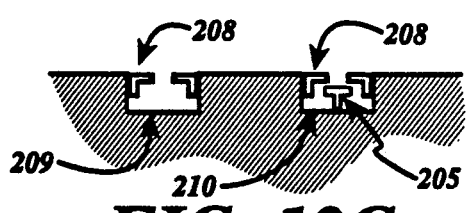
Figure 12H:
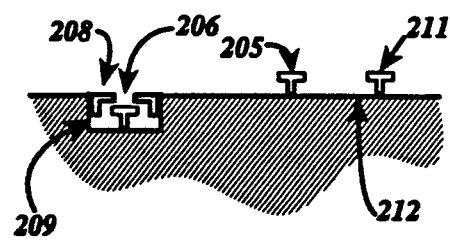
Figure 12I:
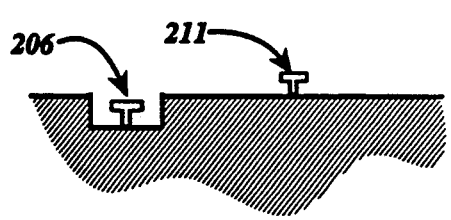
Figure 12J:
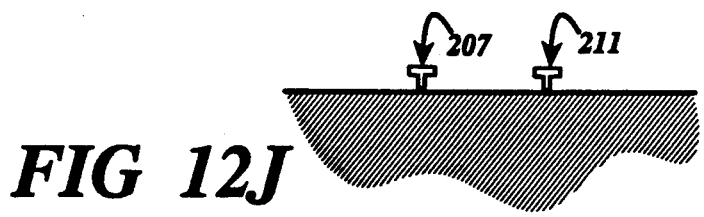

It is to be appreciated that the above-described inverted switching junction can provide a two-way interchange facilitating both exit from a through guideway onto a transfer guideway and merging from a transfer guideway to a through guideway. FIG. 12K is illustrative. A vehicle 504 on a through guideway 501 enters transfer guideway 502 by entering a switching junction 503. The vehicle 504 on continuous through guideway 501 enters the junction 503 at 506 and could be directed onto the continuous transfer guideway 502 as described hereinabove. Similarly, a vehicle 505 on the transfer guideway 502 could exit said guideway by entering the junction 503 at 507 and being directed onto the continuous through guideway 501 in like manner.

A retractable guideway mounted switching device shown generally in FIG. 13 comprises a recessed connecting guiderail 115. When no vehicle is exiting to guideway 52, the recess connecting guiderail 115 rests flush with the paved surface of the guideway. The wheels on the guideway pass over the connecting guiderail 115. Upon receipt of an electronic impulse command either from a vehicle or the operation center, the recess connecting guiderail 115 raises to the height of the primary guiderail 11 and the exit guiderail 11. Once so raised, primary, secondary, or emergency backup steering guides the vehicles onto the exit guideway 52 by tracking the connecting guiderail 115.

The present invention further provides for electronic sensors (not shown) to be placed at strategic positions near a switching junction. The function of these sensors is to insure accident-free merging and exiting of vehicles onto and from a guideway. Although many methods may be utilized, it is preferred that a series of sensors be placed on the two merging guideways at positions equidistant from a junction. The sensors would relay the position of a merging or exiting vehicle and the position of the other vehicle already on the primary guideway to the operations center. The operations center includes computerized computer means that would maintain a predetermined safety distribution of vehicles. The merging vehicle is electronically instructed to slow down or speed up to insure a safe merge.

In a similar manner, electronic sensors may be placed at strategic positions along a primary guideway to monitor the progress of vehicles along that guideway. Such sensors communicate directly with the operations center described in detail below, and are utilized to measure the distance between any two vehicles on a guideway, the speed of any vehicle or the relative speeds of any two vehicles. The sensors may comprise "electric eye" devices, the technology of which is well known. An alternative form of vehicle monitoring may include transmission of vehicle positions directly from the sensors to the vehicle so as to permit speed adjustment, directional change, and like operations to be performed by the onboard microprocessor.

Of course, various modifications of the continuous guideway network could be effected. Thus, it should be understood that the above relates only to the preferred embodiment, and that any such modifications are within the scope of the present invention.

LEVEL OF SERVICE ZONING

The present invention further provides for the segregation of vehicles on the guideways according to speed, size and/or function, while yet integrating their operation over a network of guideways. Referred to as level of service zoning, the present invention provides for a variety of vehicles to share a network of guideways even though such vehicles have many varied characteristics. Described in brief, level of service zoning restricts a vehicle to a particular zone or zones with which it is compatible.

The present invention provides five distinct levels-of-service zones. These zones are as follows:

Level 1: Neighborhood—A neighborhood zone includes residential or other heavily populated areas. Vehicles on a level 1 guideway are permitted a maximum speed of fifteen miles per hour and are constructed with a four-foot or six-foot wide wheel base. Thus, type I, II, III, IV, IX and VIII would be permitted in this zone.

Level 2: Collector-Distributor—A collector-distributor guideway permits only those vehicles having a four-foot or six-foot wide wheel base, and restricts speeds to thirty miles per hour. Thus, type II, III, IV, IX and VIII vehicles would be permitted in this zone.

Level 3: Regional—A regional zone includes guideways which restrict vehicles traveling thereon to four- or six-foot wheel bases, and restricts speed to sixty miles per hour. Acceptable vehicle types are therefore III, IV, V, VI, IX and XI.

Level 4: Long-Distance Zone—A long-distance zone includes guideways designed for high-speed extended travel. This zone permits vehicles having wheel base widths of six and/or eight feet, and restricts speed to one hundred miles per hour. Thus, passenger and cargo vehicle types IV, VI, VII, X, XII and XIII are permitted.

Level 5: Cargo Zone—This zone includes guideways identical to those in level four, but restricts all traffic to cargo vehicles IX, X and XII. These would have a very low speed to allow the bulky-heavy vehicles to access industrial areas of a region.

A vehicle may not enter an incompatible level-of-service zone. For example, a Type VII vehicle is incompatible with a Level 1 service designation because its wheelbase dimension is eight feet, and a neighborhood zone guideway is restricted to vehicles having four-foot and six-foot wheelbases. Similarly, a Type I vehicle is unable to transfer from a level-of-service zone 1 to a level 2 service zone because a Type I vehicle is not capable of travel at 30 miles per hour. Thus, the vehicles are segregated by size and speed for safety. (As a further precaution, the level-of-service screening key described below provides a physical barrier to improper transfers.)

This segregation of vehicles within the various level-of-service zones is done at the operations center. In sum, the operations center comprises a clearinghouse of system information. FIG. 14 is a diagrammatic view of the flow of information through the operations center. As shown therein, the present embodiment provides three traffic flow controls: (1) interchange control, (2) regional control, and (3) local control. Each of these control functions is a computer program designed to route traffic flow within a particular subsystem of the comprehensive unit transportation system.

Local control is designed to route traffic flow within a local guideway system such as Level 1 and 2 guideway zones. Should a vehicle need to leave the level 1 or 2 zones to reach a desired destination, its route is planned by regional control. This computer program determines the preferred route, and relays that route to another program—Traffic Status. Regional control also relays the route to the Interchange Control program. Because, each closed loop interchange is preferably programmed individually, interchange control includes a program for each closed loop interchange. A preferred method of interchange control programming is to generate a vehicle identification number and a closed loop interchange identification number for each transitional interface junction on the interchange. For each closed loop interchange, a numeric list of vehicles that are to use that interchange is generated as well as which junctions are to be used by each. The timing of vehicles utilizing a particular closed loop interchange is then determined within such listing. Of course, various programs may be developed.

The interchange, regional and local control programs also interface with a traffic status program. Generally described, the traffic status function is a tabulating program which monitors the current state of the system. The traffic status program receives information from guideway sensors which monitor the position of vehicles within the system. Traffic status also receives input from dispatch control, inventory control, and vehicle maintenance. The vehicle maintenance program monitors and updates the status of vehicles needing repair. The inventory control program monitors and updates the number of vehicles available for dispatch. The dispatch control program allocates the available vehicles. Preferably, the dispatch control program compares the number of available vehicles monitored by the inventory control program with system vehicle demand (described immediately below), and dispatches vehicles accordingly. The demand for vehicles within the system is projected and analyzed by the logistic planning program, which also inputs to the traffic status program. The logistic planning program determines where all traffic originates and terminates, what type of vehicles have been requested, the distance of each trip, time of day, time required for each trip, and other like information. From such information, the logistic planning program generates a projected vehicle utilization schedule.

The traffic status control program interfaces directly with a guideway control program. The guideway control program receives updated information as to the state of the system from traffic status. The guideway control program then implements the desired traffic flow as developed by the logistics planning program. The guideway control program implements the desired traffic flow by sending electronic impulses to the vehicle control devices. Thus, it is seen that the operations center not only provides a clearing house of system information, but further provides an operative system hub, directing and controlling traffic flow throughout the system. In particular, the operations center segregates the vehicles within their appropriate level of service zones.

To further insure such segregation of vehicles, the present invention provides level-of-service screening keys. Each vehicle is fitted with a front and a rear "key". These level-of-service screening keys, as described below, make it physically impossible for a vehicle incompatible with a particular guideway to enter that guideway.

A level-of-service screening key according to the present invention consists of a guideway mounted component and a vehicle mounted component. As shown in FIG. 15, a first embodiment of the vehicle mounted component 160 includes a stylus 162 which is secured to and extends from the right flared throat section 48 of the raised guide rail shoe 40. A second embodiment is shown in FIG. 16, wherein the vehicle component comprises an extension 164 of the shoe 40. The extension 164 consists of a flat bar member placed across the front top surface of the shoe 40. A third vehicle mounted component is an extension member 166 which extends rearwardly of the shoe 40. As shown in FIG. 17, the extension member 166 protrudes from the left rear side of the shoe 40. The guideway mounted component 170, as shown in FIG. 17, comprises a short guide rail segment 172. The screening key guide rail segment 172 is of reduced height relative to a raised guide rail 11, yet of sufficient height to make contact with the vehicle mounted component 162 or 164 as described below.

Operation of the level-of-service screening key for a vehicle attempting to access a higher guideway for which it is incompatible is disclosed by example. Assume that a Type I vehicle attempts to enter a Level III service zone designation. As shown in FIG. 17, the guide rail shoe 40 of the type I vehicle is equipped with an extension 164 that extends outwardly from the raised guide rail 11. Assume the extension 164 is formed so as to extend outwardly a distance of 14 inches from the raised guide rail 11. Assume further that the Level III screening key guide rail segment 172 is positioned a distance of 9 inches from the raised guide rail 11 of the primary guideway 51. As the vehicle 20 attempts to exit, the guide rail segment 72 will contact the extension member 164 at a location approximately 5 inches from the remote end of the extension member. The shoe 40 is thereby physically stopped from moving onto the exit guideway 52. Thus, the level-of-service screening key prevents an incompatible vehicle from entering a zone level higher than its compatibility.

Operation of the level-of-service screening key for a vehicle attempting to access a lower level-of-service guideway for which it is incompatible is also disclosed by example. Assume that in FIG. 17 a large cargo vehicle Type X is to be screened from a Level III regional guideway. The Type X vehicle includes a guide rail shoe 40. The shoe 40 includes an extension member 166 which extends from the left rearward portion of the raised guide rail shoe. As the vehicle, and in particular the shoe, attempts to negotiate the turn, the flanged extension 166 is constructed so as to catch on the primary guide rail 11 immediately after its diagonal separation. The shoe 40 (and therefore the vehicle) is thus prevented from making the turn. To facilitate such action of the level-of-screening key for other level of service zones, the vehicle mounted component may be shortened or lengthened as desired. Since the gap provided in a guide rail will vary according to the speed of traffic utilizing that guideway, the shoe is accordingly lengthened or shortened to effect contact of flanged extension 166 with the surface component 15.

VEHICLE CONTROL DEVICES

The present invention further provides devices to control and monitor the movement of vehicles within the comprehensive network of continuous guideways. Of course, various devices could be provided. For example purposes, two principal control devices are disclosed: (1) merge and exit controls; and (2) control devices for maintaining a safe operating distance between vehicles on a continuous guideway.

As previously noted, it is a principal tenet of the present invention that each transitional interface provide an exit component and a merge component. The purpose of the merge/exit control devices is to synchronize vehicle traffic on the transfer guideways with any through traffic or other connecting continuous guideway, so that a vehicle may exit or enter the continuous transfer guideway without interference to any traffic on through traffic guideways.

To accomplish this purpose, traffic on the continuous transfer guideway is modulated. Stated more particularly, traffic on a continuous transfer guideway may be decelerated to a lower velocity to either allow a vehicle to exit a through traffic guideway, or to stagger the position of the vehicle on the continuous guideway loop relative to the position of a vehicle on the through traffic guideway so as to permit merger without interference. It is to be understood that traffic on the through traffic guideway (or other continuous guideway that is interfaced with a closed loop interchange) is not disturbed. Thus, traffic on the through traffic guideway moves constantly at a predetermined speed, i.e. 15, 30, 60, or 100 m.p.h. Preferably, it is only the traffic on the continuous guideway loop that is modulated.

The present invention provides two types of merge/exit control: primary and secondary. Secondary merge/exit control is a strict and straightforward application of the continuous movement/constant velocity feature of the present invention. Generally described, secondary control is a final determination of whether to merge or exit; a simple "GO" or "NO GO" determination. If the decision is "GO", the vehicle concerned exits or merges. If the decision is "NO GO", the vehicle remains on its present guideway, whether that be a through traffic guideway or a continuous guideway loop. Primary control is a relaxed application of the continuous movement/constant velocity feature of the present invention in that it allows interchange traffic to be modulated. Primary control is the preferred operating technique. Secondary control is an emergency or back-up technique that supplements primary control in the event of its malfunction.

As described in detail below, primary control requires a greater amount of time and distance because a vehicle's velocity is adjusted or modulated to permit exit or merger. The preferred method of primary control is described by example. Assume that a vehicle is travelling north on a through traffic guideway. The vehicle exits this through traffic guideway at a transitional interface and starts to travel around the continuous guideway loop. The passengers in the vehicle desire to travel eastwardly on a through traffic guideway. Thus, the vehicle must exit the guideway loop and merge onto the through traffic guideway upon which vehicles travel in an easterly direction. Assume further that two vehicles are travelling easterly on this through traffic guideway.

The vehicle on the closed interchange loop must merge onto the eastward through traffic guideway without interfering with the two vehicles travelling easterly on that through guideway. In accordance with the preferred form of the primary exit/merge control, three pairs of sensors are positioned on the continuous guideway loop. Additionally, three pairs of sensors are positioned correspondingly on the through guideway upon which vehicles travel in an easterly direction. All such pairs of sensors are strategically placed. More particularly, the first pairs of sensors on the through guideway and on the continuous guideway loop are positioned equadistant from the merge point, otherwise referred to as a transitional interface. The second pairs of sensors are likewise placed equadistant from the transitional interface, but somewhat closer than the first pairs of sensors. Finally, the third pair of sensors are also positioned equadistant from the transitional interface upon the through guideway and the transfer guideway respectively, but somewhat closer than the second pair of sensors. As a vehicle passes over each and any pair of sensors, its position is recorded, speed calculated and the time noted electronically.

The preferred form of primary exit/merge control provides means for a safe merger of the transferring vehicle onto the eastward through guideway. These readings and recordings can further be manipulated to derive the relative position of the vehicle on the continuous guideway loop. The relative velocity and spacing calculations for all of the vehicles are then compared. If the spacing between the two easterly travelling vehicles is sufficiently greater than a predetermined clearance value, the vehicle on the continuous guideway loop is authorized to merge onto the through traffic guideway upon which vehicles travel in an easterly direction. Of course, this algorithm may be repeated to determine if sufficient clearance exists for a vehicle to exit the guideway.

Of course, other means could be provided. For example, the initial time readings recorded by the outermost pair of equidistant sensors could be compared to insure that a proper clearance distance is present.

Assume further that the required clearance is not present. Then, the speed of the first vehicle must be modulated in order to generate an acceptable clearance. It is to be noted that a brief decrease in speed produces a significant staggering of vehicles. For example, assume that all the vehicles are traveling at 60 m.p.h. The speed of vehicle which is to merge into the eastward through traffic guideway may be reduced 5% (to 57 m.p.h.) for a period of 5 seconds to shift its position relative to either the first eastward vehicle or the second eastward vehicle a distance of twenty-two (22) feet. Of course, as noted above, if the vehicle to merge remains on a collision course, the vehicle to merge may be redirected around the continuous guideway loop for another merge attempt.

The present invention further provides means for maintaining a safe operating distance between vehicles on a continuous guideway. Broadly speaking, the present invention provides two approaches: external means and internal means. External means refers to the provision of signal technology to detect or transmit to leading and following vehicles relevant information concerning the position of one particular vehicle. Internal means refers to utilization of a vehicle mounted device that transmits to guideway mounted devices through lines in the raised guide rail to other vehicles and system control computers. As described in detail below, an internal system using position identification constants is preferred because it provides the most efficient solution to not only maintaining a safe operating distance between vehicles, but has further application to the merger/exit control function described above.

To implement external means for maintaining a safe operating distance between vehicles, each vehicle is provided with a radio frequency transmitter and receiver. The transmitter expels a continuous signal that is received by the immediately preceding and succeeding vehicles on a segment of continuous guideway. This signal carries information pertaining to the present position and speed of that vehicle. This vehicle is also receiving similar input from the immediately preceding and succeeding vehicles. Through this exchange of information, an onboard microprocessor may be utilized to determine whether a proper distance exists between vehicles. It is the opinion of the applicant that such technology is known to those skilled in the art, and hence, need not be disclosed further herein.

Figure 20A:
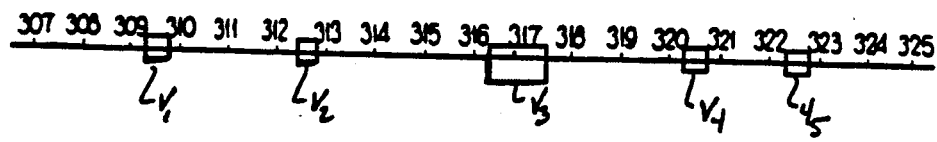
FIGS. 20A, B, C, and D are diagrammatic views of a series of coordinating devices for maintaining a safe operating distance between vehicles on a continuous guideway.

As noted above, internal means for maintaining a safe operating distance between vehicles may be implemented using direct transmission from a vehicle mounted device to guideway mounted devices, through lines in the guide rail to other vehicles and system control computers. Conceptually described, implementation of the internal system involves dividing the length of the raised guide rail 11 in discrete segments of equal length. The end point of each such segment is assigned a numerical value, hereinafter referred to as a position identification constant. The length of each such segment, while preferably being equal, may be selected as desired. As will be seen from reading the following description, the shorter the segment length selected, the greater the resolution of the system. An example of a position identification coordinate system is shown in FIG. 20A, wherein the numeric values 307–325 have been sequentially assigned at the endpoint of several segment lengths.

In accordance with the internal system, an electronic apparatus is placed at each segment endpoint, as defined by the position identification constant. Each such electronic apparatus includes a sensing device, a receiving device, a transmitting device, a timing device and a comparator device (such as a microprocessor). It is preferred that each electronic apparatus be hardwired to the immediately preceding and the immediately succeeding electronic apparatus. If desired, radio frequency transmission/reception devices or fiber optic technology may be employed. The electronic apparatus is hereafter referred to as a "pic", indicating the electronic device utilized by the position identification coordinate system.

It is the exchange of information that is gathered, transmitted and received by each pic that insures a safe operating distance between vehicles. To facilitate this exchange, each pic has a passive and an active state. Under normal operating conditions, the pic is in a passive state. In the passive state, the pic allows a signal being carried along the wires between other pics to travel past it. This signal constitutes an electronic impulse corresponding to the position identification constant.

A pic generates a signal carrying such a position identification constant only when a vehicle passes by it. Thus, a particular pic always generates the same position identification constant. This signal travels in both directions along wires in the guide rail. This signal will operate to activate only the pic that is immediately in front of it, such direction being defined by the direction of vehicular travel. Thus, referring to FIG. 20A, when a vehicle $V_3$ passes over pic 317, the position identification constant 317 is electronically generated by the pic at that location, and transmitted in the direction of the pics located at 316 and 318. Only pic 318 is activated when the signal generated by pic 317 passes it.

An activated pic will not allow a signal carrying the position identification constant to flow past it. Instead, an activated pic will retain the first position identification of highest value that it receives a buffer memory, and count time from the moment of such reception. Furthermore, an activated pic will retain in yet another buffer memory the first position identification of lower value that it receives, and count time from the moment of such reception. The activated pic will further count time from the moment it is first activated. Thus, referring again to FIG. 20A, when a vehicle $V_4$ passes over a pic 321, the pic 318 will receive, retain and block the signal carrying position identification constant 321, and begin counting time. When a vehicle $V_5$ passes over pic 323, a signal is generated carrying position identification constant 323, but it will never reach pic 317. Instead, this signal carrying position identification constant 323 will be received, retained and blocked at pic 321 or pic 322, depending on which is activated at that instant when vehicle $V_5$ passes over pic 323.

To continue with the example, when vehicle $V_2$ passes over pic 313, a position identification constant numeral 313 is generated. This signal will be received, retained and blocked at pic 318. Pic 318 will begin counting time from the moment that such signal is received. Meanwhile, pic 318 is also counting time from the moment it was activated by vehicle V₃ passing over pic 317. When vehicle V₁ passes over pic 310, it will generate a signal carrying the position identification constant numeral 310. This signal will be received, retained, blocked and timed, as described above, at either pic 313 or pic 314, depending on the location of vehicle V₂ at that instant.

It is to be noted that pic 318 can actually receive only one higher position identification constant (319) and only one lower position identification constant (317).

When the vehicle V₃ passes over pic 318, the electronic apparatus of pic 318 transmits to vehicle V₃ the following information: the position identification constant 318; the time of its activation; the position identification constant 321 (as generated by vehicle V₄ passing over pic 321); the time that the signal carrying position identification constant numeral 321 is retained; position identification constant numeral 313 (as generated by pic 313 when vehicle V₂ passes thereover); and the time period over which the signal carrying position identification constant numeral 313 is retained. Pic 318 then transmits position identification constant numeral 318 into the lines (and back to a integrally connected computer). Then, pic 318 initializes all memory, timing devices and other comparator features so as to return to a passive state. Thus, it is to be understood that pic 318 has completed one cycle. It is to be noted that a pic, as an electronic apparatus, is not merely a computing or logic device. Rather, it is a fixed sequence receiver buffer memory as used in conjunction with a transmitter and planning device. If desired, a comparator unit may be carried onboard a vehicle. Such a comparator unit could contain appropriate information with which to maintain a particular distance between any two vehicles.

If a vehicle has such an onboard computing device, it will know the precise location of vehicle V₃ because pic 318 is unique. Similarly, the location of any other vehicle may be monitored by systems computers integrally connected with the hard wires for the purpose of monitoring the location of a particular vehicle. If a numeric value for a desired separation between vehicles is to be calculated, the following algorithms may be employed.

$C [(\text{Position Identification Constant}_{High} + \text{Time}_{High}) -$ a. $(\text{Position Identification Constant}_{Activated})] -$

[Vehicle Speed] = Leading Vehicle Separation $C[(\text{Position Identification Constant}_{Activated})$ b. $(\text{Position Identification Constant}_{Low} + \text{Time}_{Low})] -$

[Vehicle Speed] = Following Vehicle Separation (Where C is a constant with a value 1 when the distance between pics is the same as the numerical value of velocity in feet per second. Further, T is set to a value from zero to one giving the assigned velocity for the guideway.)

Further to the coordinating of merging and exiting vehicles, the position identification constant and pic electronic apparatus can also provide a means of primary control. It is to be understood that a comparator, such as a microprocessor, may be provided either in conjunction with the entire system or onboard a particular vehicle for the purpose of coordinating exit and merge activity.

Figure 20B:
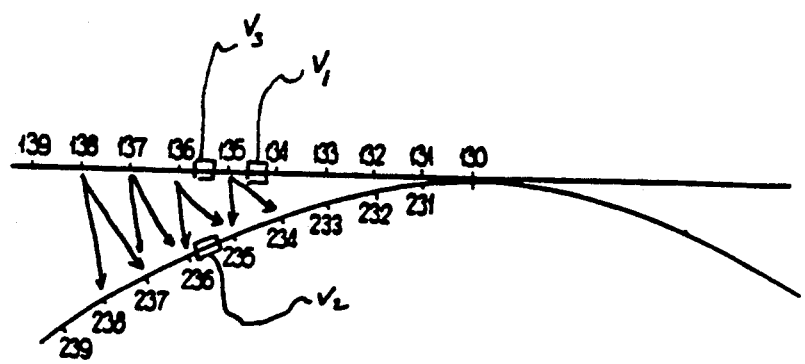
Figure 20C:
Figure 20D:
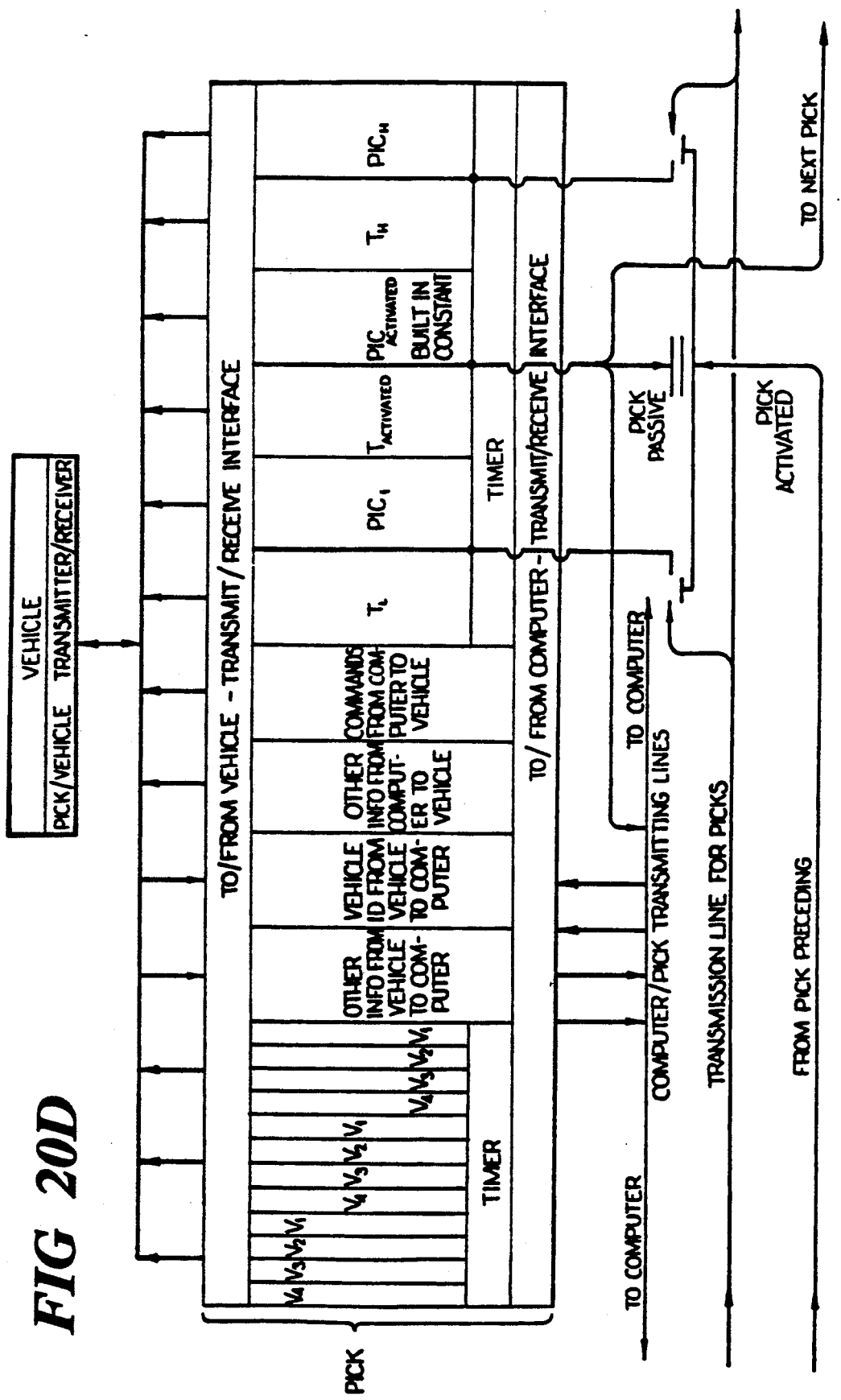

Such utilization of the position identification coordinate and pic electronic apparatus is shown schematically in FIG. 20B. Referring thereto, FIG. 20B shows vehicles V₁ and V₃ traveling on a guideway. As shown, these vehicles V₁ and V₃ are traveling to the right and have just crossed pics 135 and 136, respectively. As a result, pic 135 sent a signal to pic 235 (as indicated by an arrow). This transmission started a counter/timer denoted $T_{lead}$ in FIG. 20D. Additionally, a similar, simultaneous signal was transmitted to pic 234. The receipt of this signal activated a counter labeled $T_{follow}$ in FIG. 20D. Similarly, the vehicle V₃ when it crossed pic 136, caused counters in pics 236 and 235 to initiate counting sequences. These timers count incrementally and then are initialized to a zero (0) position until another vehicle passes thereover. Thus, when a vehicle V₂ passes over pic 235, the pic 235 will transmit to suitable devices onboard vehicle V₂ the time when the leading vehicle V₁ and the following vehicle V₃ passed a known position. This known position is pic 135 for vehicle V₁ and 136 for vehicle V₃. The comparator circuits within the onboard computing device are then able to determine the position of vehicle V₂ relative to vehicle V₁ and vehicle V₃. The appropriate velocity decisions may then be made and implemented to provide a safe merge or exit. The signals from pics 135 and 136 comprise electronic impulses that activate timing mechanism. Thus, in this alternative embodiment of coordinating merging and exiting vehicles, the signals need carry no information.

It should be noted that there exists no internal means for computers monitoring and coordinating system used to communicate directly with any particular vehicle, except for that information that is exchanged through the pic electronic apparati. Therefore, a pic may be improved upon to provide a buffer memory that is capable of storing commands, data, information and messages to and from vehicles and to and from system computers. Additionally, this transmitting ability may be upgraded to allow a twoway transfer of information, thereby allowing for a message to be sent and received between any particular vehicle and pic and between a pic and system computer. The flow of information is depicted schematically in FIG. 20D.

Figure 19:
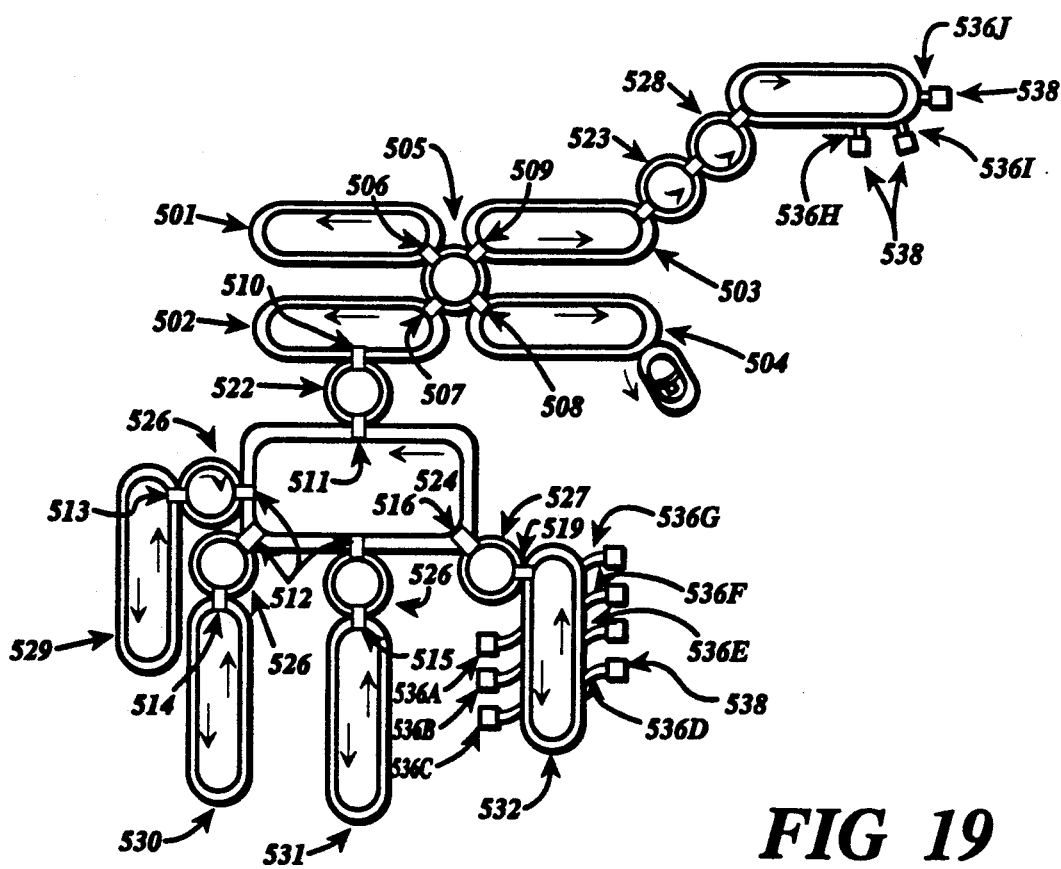
FIG. 19 is a diagrammatic view of the three different types of guideways according to the present invention.

Referring to FIG. 19, a plurality of through guideways 501, 502, 503 and 504 are shown. The through guideways 501–504 are set at a level of service of sixty miles per hour. An interconnecting or interchange guideway 505 is provided, also with a level of service of sixty miles per hour. Switching junctions as described hereinabove are located at 506, 507, 508 and 509 to connect respective guideways 501, 502, 503 and 504 to the interconnecting guideway 505.

A transfer interchange 522 is provided to interconnect through guideway 502 and a through guideway 524. The through guideway 524 has a level of service of thirty miles per hour. Thus, the interconnecting guideway 522 also serves the function of decreasing speeds of vehicles thereon from the sixty mile an hour service of guideway 502 to the thirty mile an hour service of guideway 524. Transfer of vehicles from guideway 502 to the interconnecting guideway 502 is accomplished at switching junction 510. Transfer of vehicles from interconnecting guideway 522 to through guideway 524 is accomplished at switching junction 511. A series of interconnecting guideways 526a, 526b, and 526c are provided. The interconnecting guideways 526a–526c interconnect through guideways 529, 530 and 531, respectively, with through guideway 524. The through guideways 529, 530 and 531 are provided with a 15 mile an hour level of service and thus, the interconnecting guideways 526a–526c also serve the function of decreasing (or increasing) the speed of vehicles between the respective guideways.

Another interconnecting guideway 527 is provided. Guideway 527 interconnects through guideway 524 at switching junction 516 with a through guideway 532 at switching junction 517. The through guideway 532 has a 15 mile an hour level of service and, accordingly, interconnecting guideway 527 accomplishes the speed decrease/increase function. Terminal guideway segments 536a–536g branch off of through guideway 532. Each terminal guideway segment connects a terminus (defined hereinabove as a point of origin or a point of destination) with the through guideway 532.

An interconnecting guideway 523 and an interconnecting guideway 528 are provided to connect through guideway 503 with a through guideway 533. Through guideway 533 has a fifteen mile per hour level of service. Thus, interconnecting guideway 523 accomplishes a decrease (or increase) of speed from sixty miles per hour to 30 miles per hour; and guideway 528 accomplishes a further reduction of speed from thirty mile per hour to fifteen mile per hour. As with the terminal guideway segments 536a–536g associated with through guideway 532, terminal guideway segments 536h, 536i and 536j are provided to interconnect terminal points 536h–536j with through guideway 533.

FIG. 19 provides descriptive arrows indicating direction of travel of any vehicle upon a particular guideway. These errors serve no other function and hence, are not identified by number.

It will be appreciated that a vehicle can thus transport passengers or cargo from any point of origin to a point of destination without stopping. For example, a vehicle could leave a terminus point 536b and travel on through guideway 532, interconnecting transfer guideway 527, through guideway 524, interconnecting guideway 522, guideway 502, interconnecting guideway 505, through guideway 509, interconnecting guideway 523, interconnecting guideway 528 onto through guideway 533 to reach any terminal point on such through guideway. Of course, return travel could be effected in the same or a different route, depending on the needs of the user.

It is thus seen that the present invention enjoys many advantages over the prior art. The present invention provides a network of continuous guideways which eliminates conventional intersections by means of the closed loop interchanges. Furthermore, all traffic on a particular guideway travels unidirectionally. Thus, the present invention provides a safer transportation system. A unit transportation system according to the present invention moves a passenger or a unit of cargo directly from a point of origin to a point of destination. Thus, time is saved and the system is more efficient. A transportation system according to the present invention further provides a comprehensive electronic monitoring and operating center. Thus, the potential for human error is significantly reduced if not eliminated.

It should be understood that the foregoing relates only to the preferred embodiment of the present invention and that numerous modifications or alterations may be made therein without departing from the spirit and scope of the invention as set forth in the appended claims.

What is claimed is:

1. A transportation system, comprising:

a network of guideways comprising through guideways crossing one another at different levels to define a plurality of intersections, each of said through guideways comprising a T-shaped raised guiderail anchored to a roadbed surface, said guideways being segregated into a plurality of level-of-service zones according to a predetermined, substantially constant, traffic speed;

said network of guideways further comprising at least one tangential loop transfer guideway interconnecting said through guideways at each of said intersections, each of said tangential loop transfer guideways including a T-shaped raised guiderail secured upon one of a plurality of roadbed surfaces and having at least one point of tangency with one of said through guideways, said point of tangency being characterized by a merge rail segment, a loop rail segment unconnected to said through guideway, and an exit rail segment;

a plurality of self-propelled vehicles adapted for unidirectional travel about said network of through guideways and tangential loop transfer guideways, said vehicles each including a downwardly extending guide rail shoe enveloping said raised guiderail so as to physically constrain each of said vehicles upon said guideway, each shoe further comprising means for electronically sensing said raised guide rail such that said vehicle tracks said raised guiderail;

said vehicles being designated for travel within one or more of said level-of-service zones;

means for selectively guiding said vehicles from a point of origin to a point of destination within said network of guideways, said guiding means including means for selectively guiding a first vehicle on one of said tangential loop transfer guideways such that upon said first vehicle and said second vehicle reaching said point of tangency at the same time, said first vehicle moves at constant speed along said through guideway and said second vehicle is directed around said tangential loop transfer guideway via said loop rail segment at constant speed;

each one of said level-of-service zones including means for permitting only said designated vehicles to enter such said level-of-service zone, said permitting means comprising a level-of-service screening key;

a vehicle mounted component comprising a horizontal member attached to said vehicle; and a guideway mounted component comprising a raised rail member located immediately prior to said merging point and parallel to said raised guiderail, whereby contact of said horizontal member mounted on said vehicle with said raised rail member prevents entrance of said non-designated vehicle into said zones, the distance of said raised rail member from said raised guide rail dependent upon which level of service zone said continuous guideway intersects.

2. The transportation system of claim 1, wherein said vehicle mounted component of said level-of-service screening key comprises an extension member secured to said vehicle whereby contact of said extension member with said raised guiderail prevents movement of said non-designated vehicles into said zones.

3. A transportation system as recited in claim 1, further comprising means to modulate the spped of a vehicle to permit merger of the vehicle between the transfer guideway and the through guideway.

4. A transportation system as recited in claim 1, further comprising a means to maintain a safe operating distance between vehicles.

* * * * *